(12) United States Patent
Owen

(10) Patent No.: US 8,159,841 B2
(45) Date of Patent: Apr. 17, 2012

(54) LOW HARMONIC RECTIFIER CIRCUIT

(75) Inventor: Donald W. Owen, Plano, TX (US)

(73) Assignee: Howard Industries, Inc., Laurel, MS (US)

( * ) Notice: Subject to any disclaimer, the term of this patent is extended or adjusted under 35 U.S.C. 154(b) by 428 days.

(21) Appl. No.: 12/419,107

(22) Filed: Apr. 6, 2009

(65) Prior Publication Data

US 2009/0251932 A1    Oct. 8, 2009

Related U.S. Application Data

(60) Provisional application No. 61/042,466, filed on Apr. 4, 2008.

(51) Int. Cl.
*H02M 1/12* (2006.01)
(52) U.S. Cl. ............................. 363/47; 363/45
(58) Field of Classification Search .................... 363/45, 363/46, 47, 126
See application file for complete search history.

(56) References Cited

U.S. PATENT DOCUMENTS

| | | | | |
|---|---|---|---|---|
| 3,913,005 A * | 10/1975 | Cook | | 363/171 |
| 3,986,121 A | 10/1976 | Oehrli | | |
| 4,876,634 A * | 10/1989 | Paice | | 363/5 |
| 5,124,904 A * | 6/1992 | Paice | | 363/3 |
| 5,148,357 A * | 9/1992 | Paice | | 363/5 |
| 5,835,364 A * | 11/1998 | DeWinter et al. | | 363/45 |
| 6,178,102 B1 * | 1/2001 | Stanley | | 363/44 |
| 6,191,968 B1 * | 2/2001 | Paice | | 363/148 |
| 6,317,332 B1 | 11/2001 | Weber et al. | | |
| 6,507,505 B2 * | 1/2003 | Oka et al. | | 363/47 |
| 6,525,951 B1 * | 2/2003 | Paice | | 363/154 |
| 7,233,506 B1 * | 6/2007 | Paice | | 363/45 |
| 7,277,302 B2 * | 10/2007 | Gazel et al. | | 363/5 |
| 2002/0190697 A1 | 12/2002 | Ferens | | |

\* cited by examiner

*Primary Examiner* — Shawn Riley
(74) *Attorney, Agent, or Firm* — Butler, Snow, O'Mara Stevens & Cannada PLLC

(57) ABSTRACT

A method, device, and plurality of circuit enhancements for a rectifier system that enable reduction in lower order and higher order harmonics, without substantially reducing the rectifier's direct current output voltage. The rectifier system comprises a phase shifting primary transformer subsystem and a multi-pulse rectifier. At least one series impedance path is coupled to one of three input terminals/leads of the transformer subsystem and conducts one phase of three phase currents from a power supply to the transformer subsystem. The series impedance path provides low impedance to the $1^{st}$ harmonic and substantially higher, inductive impedance to higher harmonics of the power supply frequency. The impedance of the series impedance path at a selected frequency above a third harmonic of the power supply's fundamental frequency divided by the impedance at the fundamental frequency of the three phase power supply is substantially greater than the selected frequency divided by the fundamental frequency of the power supply.

35 Claims, 12 Drawing Sheets

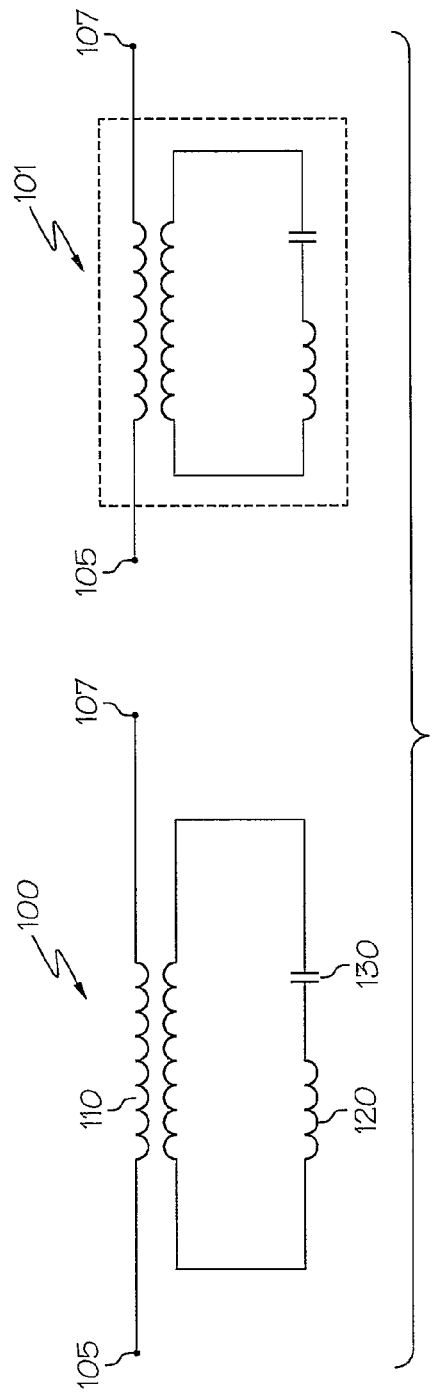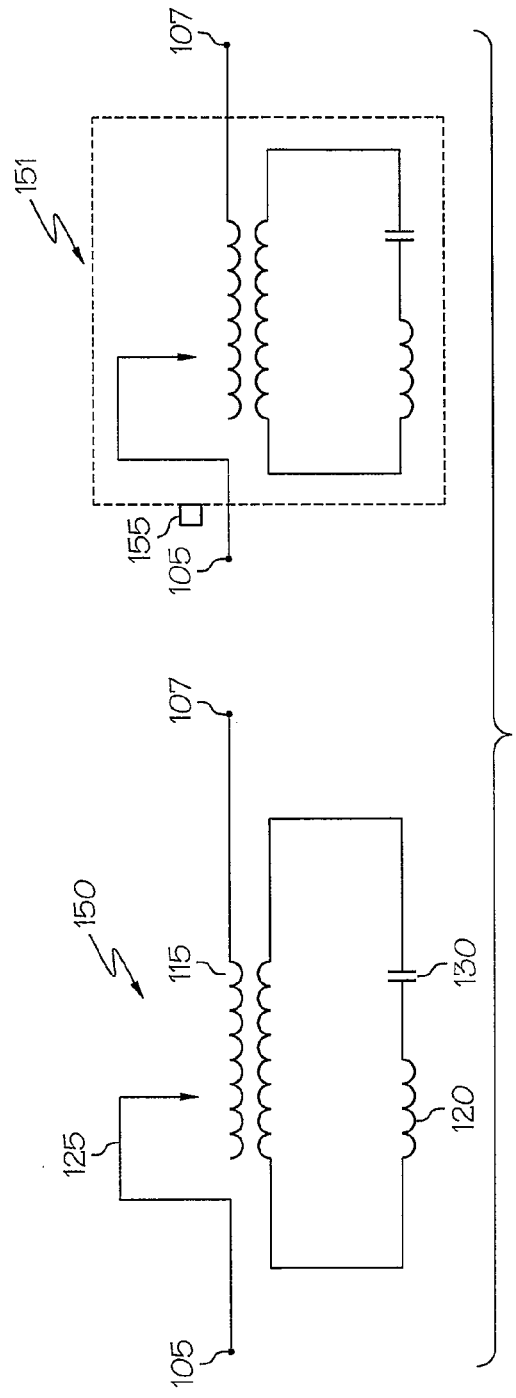

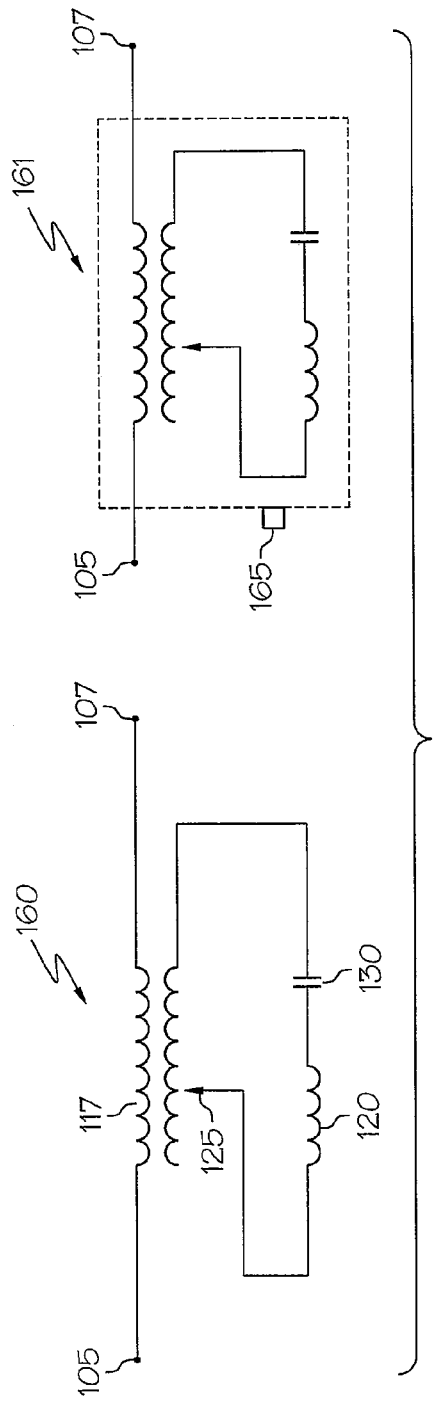
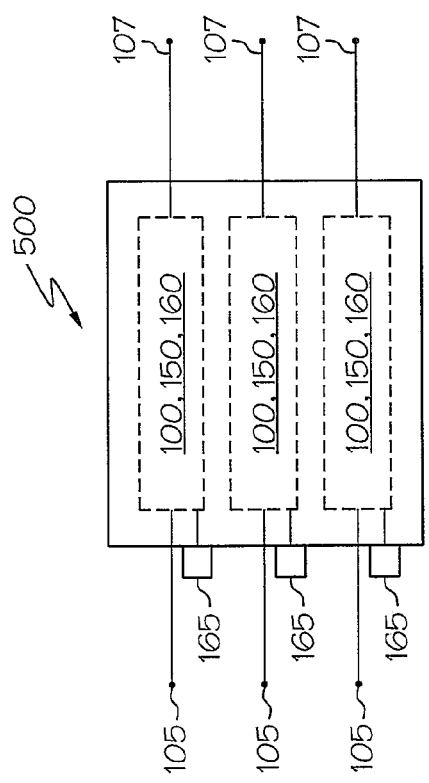
FIG.1C
FIG.5A

LOW HARMONIC RECTIFIER CIRCUIT

PRIORITY CLAIM

Benefit of priority under 35 U.S.C. §119(e) is claimed based on U.S. Provisional Application No. 61/042,466, entitled, "Low Harmonic Converter Circuit," filed on Apr. 4, 2008, which disclosure is incorporated herein by reference.

BACKGROUND OF THE INVENTION

1. Technical Field

This invention relates generally to electrical circuits and in particular to rectifier devices/systems comprising an electrical transformer coupled to a multiple pulse rectifier. Still more particularly, the present invention relates to electrical circuits and designs thereof for reducing harmonic currents with rectifier devices/systems.

2. Description of the Related Art

Multiple pulse rectifiers, such as 12-pulse rectifiers, typically exhibit less than ideal characteristics when connected to an output of a transformer. One major concern with such rectifier devices/systems (i.e., a transformer with output leads coupled to a multiple pulse rectifier) is the tendency for the rectifier input to exhibit harmonic currents that also flow in the power source. These harmonic currents are a combination of lower order harmonics and higher order harmonics. This flow of harmonic currents needs to be controlled in order for the rectifier system to achieve optimal performance.

Several different transformer designs have been introduced to reduce the amount of lower order harmonic currents associated with current flowing in the power source and which is exhibited at the multi-pulse rectifier input. For example, improved transformers and/or transformer designs which enable/effect a reduction of the negative effects of lower order harmonics from the power source was introduced by U.S. Pat. No. 7,049,921. In this patent, several different designs of auto transformers are provided, which convert three phase input currents to six phase to enable a twelve-pulse (or higher) rectifier to be energized from a three phase power source. In addition to the benefit of this particular design enabling twelve pulse rectification, another significant benefit achieved by twelve pulse rectification is the substantial reduction in the $5^{th}$ and $7^{th}$ harmonic components of current flowing in the power source.

The harmonic current associated with twelve-pulse rectifiers (converters) is lower than with equivalent six-pulse rectifiers. However, the harmonic current associated with twelve-pulse rectifiers is often not sufficiently low for certain applications. Also, it is often necessary to mitigate higher order harmonics that are associated with rectifiers in order to meet the desired harmonic levels. Examples of such higher order harmonics are the $11^{th}$, $13^{th}$, $17^{th}$ and $19^{th}$ harmonics. These higher order harmonics can be mitigated by increasing the rectifier pulses to eighteen pulse, twenty-four pulse or higher. However, the use of eighteen-pulse, twenty-four-pulse or higher-pulse rectifiers causes a significant increase in the cost of the rectifier and in the cost of the associated phase shifting transformers connected thereto.

One suggestion for mitigating the higher order harmonics in these rectifier systems involves connecting inductors in series after/along the three phase power lines feeding the rectifier circuit. However, when the inductance is high enough to significantly mitigate the harmonic current, the DC voltage at the rectifier output is significantly reduced. Such reduction in DC voltage is not a desired result, and thus the use of inductors alone does not provide an acceptable design approach.

SUMMARY OF THE INVENTION

Disclosed are a method, a plurality of circuit devices, and a plurality of circuit enhancements for rectifier systems/devices that enable reduction in both lower order and higher order harmonics, without causing a substantial reduction in the rectifier system's DC (direct current) output voltage. In a first implementation, the embodiment provides an electrical device comprising: a 2N-pulse rectifier having N inputs (where N is a whole number multiple of three) and providing a set of output terminals/leads, including at least one negative and one positive output terminal/lead; a transformer subsystem having at least one multiple phase transformer with (a) three input terminals/leads, and (b) N output terminals/leads arranged for electrical connection to respective ones of the N inputs of the 2N-pulse rectifier; and three series impedance paths, each coupled to one of the three input terminals/leads of the transformer subsystem and which conduct three phase currents from a three phase power supply to the three input terminals/leads of the transformer subsystem, wherein an impedance of each series impedance path is affected by the frequency of the current flowing through the path and wherein the impedance of each series impedance path at a selected frequency higher than a third harmonic of a fundamental frequency of the three phase power supply divided by the impedance at the fundamental frequency of the three phase power supply is substantially greater than the selected frequency divided by the fundamental frequency of the power supply.

According to one embodiment, each series impedance path comprises a series impedance circuit element as a separate device having an external casing, an accessible input terminal/lead and an accessible output terminal/lead, and a plurality of electrical components disposed within the external casing. The electrical components enables a reduction in harmonic currents at the 2N-pulse rectifier when the three phase currents flow through the three phase power supply at a power supply input terminal/lead of the series impedance path.

In yet another embodiment, the series impedance paths are provided within a single device having an external casing and a plurality of internal electrical components. The internal electrical components collectively provide three separately accessible input terminals/leads and three separately accessible output terminals/leads. The plurality of internal electrical components are disposed within the external casing, and collectively enables a reduction in harmonic currents at the 2N-pulse rectifier system input when connect to a load at the rectifier output and when connected to a three phase power supply at the input of the series impedance paths.

According to one embodiment, each series impedance path comprises a current transformer having a primary winding and a secondary winding. The output terminal/lead of each current transformer is coupled to one of the three power input terminal/leads of the primary transformer. The secondary winding of each current transformer is connected in series with serially-connected inductance and serially-connected capacitance. During operation of the electrical device (i.e., when connected to a three phase power source via the series impedance path), the impedance of the serially-connected capacitance substantially cancels/eliminates/offsets at least half of the impedance of the serially-connected inductance when the device is operational at the fundamental power supply frequency.

In embodiments in which the series impedance path includes a current transformer, a turns ratio from the primary winding to the secondary winding of at least one current transformer is adjustable. In one scenario, the current transformer comprises an adjustable turns mechanism associated with the primary winding to selectively change an effective number of turns of the primary winding. In another scenario, the current transformer comprises an adjustable turns mechanism associated with the secondary winding to selectively change an effective number of turns of the secondary winding that couples in series to the serially-connected capacitance and inductance.

The above as well as additional objectives, features, and advantages of the present invention will become apparent in the following detailed written description.

BRIEF DESCRIPTION OF DRAWINGS

The novel features believed characteristic of the illustrative embodiments will be set forth in the claims. The embodiments however, as well as advantages thereof, will best be understood by reference to the following detailed description of illustrative embodiments when read in conjunction with the accompanying drawings, wherein:

FIG. 1A illustrates a schematic and a block representation of a first-type (fixed) series impedance circuit utilized to reduce the higher order harmonics of the power input to a rectifier system/device, in accordance with one embodiment of the invention;

FIG. 1B illustrates a schematic and a block representation of a first configuration of a second-type (variable) series impedance circuit utilized to reduce the higher order harmonics of the power input to a rectifier system/device, in accordance with one embodiment of the invention;

FIG. 1C illustrates a schematic and a block representation of a second configuration of a second-type (variable) series impedance circuit utilized to reduce the higher order harmonics of the power input to a rectifier system/device, in accordance with one embodiment of the invention;

FIG. 5A illustrates an example off-the-shelf series impedance device, which comprises three series impedance paths enclosed within an external casing/housing and input and output terminals/leads associated with each path, in accordance with one embodiment of the invention;

DETAILED DESCRIPTION OF ILLUSTRATIVE EMBODIMENT(S)

Figure 2A:
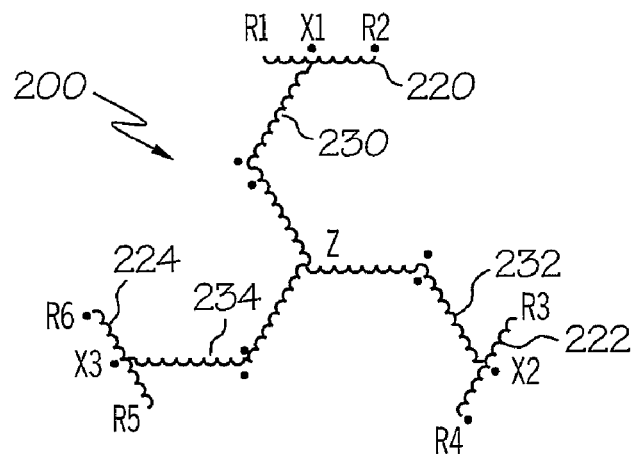
FIG. 2A is a schematic of the configuration of transformer windings that make up a zig-zag connected phase-shifting auto-transformer utilized within an example rectifier system/device, according to the prior art.

The described embodiments provide a method, a plurality of circuit devices, and a plurality of circuit enhancements for rectifier systems/devices that enable reduction in both lower order and higher order harmonics without causing a substantial reduction in the rectifier system's DC (direct current) output voltage. In a first implementation, the embodiment provides an electrical device comprising: a 2N-pulse rectifier having N inputs (where N is a whole number multiple of three) and providing a set of output terminals/leads, including at least one negative and one positive output terminal/lead; a transformer subsystem having at least one multiple phase transformer with (a) three input terminals/leads, and (b) N output terminals/leads arranged for electrical connection to respective ones of the N inputs of the 2N-pulse rectifier; and at least one (but in several of the described embodiments, three) series impedance path coupled to one of the three input terminals/leads of the transformer subsystem and which conducts one phase of the three phase currents from a three phase power supply to one of the three input terminals/leads of the transformer subsystem, wherein an impedance of the series impedance path is affected by the frequency of the current flowing through the path and wherein the impedance of the series impedance path at a selected frequency higher than a third harmonic of a fundamental frequency of the three phase power supply divided by the impedance at the fundamental frequency of the three phase power supply is substantially greater than the selected frequency divided by the fundamental frequency of the power supply.

The series impedance paths are designed to offer low impedance to the $1^{st}$ harmonic (fundamental frequency) and to offer substantially higher, inductive impedance to higher harmonics of the power supply frequency. Each series impedance path enables a reduction in harmonic currents at the 2N-pulse rectifier. Accordingly, the impedance of each series impedance path is at least twenty times as great at an eleventh harmonic of the power supply frequency as the impedance at the fundamental power supply frequency.

According to one embodiment, each series impedance path comprises a series impedance circuit as a separate device having an external casing, an accessible input terminal/lead and an accessible output terminal/lead, and a plurality of electrical components disposed within the external casing. The electrical components enables a reduction in harmonic currents at the 2N-pulse rectifier when the three phase currents flow through the three phase power supply at a power supply input terminal/lead of the series impedance path.

In yet another embodiment, the series impedance paths are provided within a single device having an external casing and a plurality of internal electrical components. The internal electrical components collectively provide three separately accessible input terminals/leads and three separately accessible output terminals/leads. The plurality of internal electrical components are disposed within the external casing, and collectively enables a reduction in harmonic currents at the 2N-pulse rectifier when the three phase currents flow through the three phase power supply at a power supply input terminal/lead of the series impedance path.

Different embodiments of the invention may provide for a different design and/or structure of circuitry and/or components that make up the series impedance paths. For simplicity of describing the invention, a single generic twelve pulse rectifier system/device is utilized throughout the description and a series impedance circuit/device based on a current transformer is illustrated and described. However, it is appreciated that the functional features of the described embodiments may be performed utilizing different selections of components connected within/along the series impedance path, and that the presentation and description of one such design is not intended to limit the scope of the invention. The invention necessarily extends to cover any combination of devices which operates to provide the desired reduction in harmonic currents at the 2N pulse rectifier and other functional features described herein. In order to cover these alternate implementations, several of the series impedance paths are simply shown/illustrated as a box, which generally represents components that collectively provide the operational impedance and harmonic responses described herein.

In a more general implementation of the embodiments, in which a current transformer is not required/utilized, the series impedance path provides impedance characteristics correlated to that of a series inductance and series capacitance. This impedance characteristic ideally exhibits minimum impedance at or near the fundamental power frequency and higher impedance at higher frequencies. That is, at or near the fundamental frequency, the absolute values of the impedance due to the inductance and the impedance due to the capacitance being utilized within the series impedance path are substantially close to each other (with the impedance due to the capacitance being at least half that of the inductive impedance); However, these values are the negative of each other, such that the sum of both impedances is a substantially smaller number (on the magnitude of one half or smaller) than the impedance due solely to the inductance. For frequencies above or below the fundamental frequency, however, the summed impedance of the capacitance and that of the inductance yields a series impedances path that exhibits a substantially high impedance at frequencies above the third harmonic (as the impedance due to the capacitance decreases). The series impedance paths with both a capacitance and an inductance thus operate as harmonic mitigation devices. With the changes to the effective impedance correlating to the frequency, the relative impedance may be defined at different frequencies as a function of frequency. Often, the frequency of the current flow is not the same as the power system frequency, and the current is made up of many components at different frequencies (generally referred to as harmonics). For purposed of the described embodiments, the frequencies which are most important are whole number multiples of the pulse-number plus and minus 1 (e.g., $11^{th}$, $13^{th}$, $23^{rd}$, $25^{th}$ harmonic in the case of 12-pulse rectification).

Unlike an inductor alone, in which the impedance is directly proportional to frequency, the impedance within the series impedance path increases faster than the frequency. At fundamental power frequency, the impedance is very low. The impedance due to the power frequency of the capacitor should cancel (counteract) most of the impedance of the inductor. Then as the frequency increases, the impedance of the inductor increases and the impedance of the capacitor decreases with the resultant impedance approaching that of the inductor alone.

According to one embodiment, each series impedance path comprises a current transformer having a primary winding and a secondary winding. The output terminal/lead of the primary winding of each current transformer is coupled to one of the three power input terminal/leads of the primary transformer. The secondary winding of each current transformer is connected in series with serially-connected inductance and serially-connected capacitance. During operation of the electrical device (i.e., when receiving three phase current from the three phase power source via the series impedance path), the impedance of the serially-connected capacitance substantially cancels/eliminates/offsets at least half of the impedance of the serially-connected inductance at the fundamental power supply frequency.

In embodiments in which the series impedance path includes a current transformer, a turns ratio from the primary winding to the secondary winding may be adjustable. In one scenario, the current transformer comprises an adjustable turns mechanism associated with the primary winding to selectively change an effective number of turns of the primary winding. In another scenario, the current transformer comprises an adjustable turns mechanism associated with the secondary winding to selectively change an effective number of turns of the secondary winding that couples in series to the serially-connected capacitance and inductance.

In yet another embodiment, the secondary winding of the series impedance circuit is serially connected in a closed loop configuration to an inductance and a capacitance. The primary winding provides an input lead and an output lead. The output lead of each primary winding of the three series impedance circuits connects to a respective one of the three power input terminals/leads of the primary transformer. The input lead of each primary winding of the three series impedance circuits provides an input terminal/point for connecting to one leg of the three phase power supply input. When the power supply is connected to these input leads, the series impedance circuits are coupled in series between the power supply and the primary transformer.

In one embodiment, the current transformers of the series impedance circuits are constructed on a three-phase core, and the inductors are constructed as three phase inductors. In one alternate embodiment, the current transformers of the series impedance circuits are selectable/adjustable ratio transformers, and the transformers may be designed with some type of adjustable ratio mechanism (e.g., an automatic tap changing mechanism, such as a solid state switch), on one or both of the primary winding and the secondary winding. The adjustable ratio mechanism may then be utilized to selectably adjust the effective ratio of the transformer.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the term "auto-transformer" includes, but is not limited to, any transformer device within which the inner windings include a zig-zag pair of windings and exhibits functional characteristics (with respect to power and reduction in higher order harmonics by blocking the flow of zero sequence currents that are associated with multiple-pulse rectifiers) similar to those described herein when describing the zig-zag auto-transformers. Additionally, the terms "rectifier" is utilized interchangeable with rectifier circuit, and is differentiated from the term "rectifier device" or "rectifier system", which terms apply to the combination of the auto-transformer coupled to a multi-pulse rectifier (see FIGS. 3B and 3C). The term impedance generally refers to anything which slows down the flow of current, and in particular to the flow of current from a power supply through the series impedance paths into the phase shifting transformer of the rectifier system.

The series impedance circuits are also referred to herein as "series impedance devices" when one or more of the circuits are housed within an external casing. When multiple series impedance circuits or devices are packaged within a single external casing, the single impedance device is referred to herein as a low harmonic impedance device. When a rectifier system is coupled at the three transformer power inputs to these series impedance circuits or series impedance devices or to a single low harmonic impedance device, the combination device is referred to herein as a "low harmonic rectifier circuit" or "LHRC". References to the termination points (or ends) of a lead are interchangeably referred to as "endpoints" and in some instances, "connectors", "terminals", or "leads", and the use of any one of these terms is not intended to limit the functionality associated therewith, and each term is equally applicable within the scope of the invention and its equivalents. In actual design of the low harmonic rectifier circuit (LHRC), the wires may be fused (or mechanically connected) to each other during device manufacture such that no visible demarcation is seen where leads of one device terminate and the leads of the serially-connected next device begin.

Turning now to the figures, which present/illustrate several embodiments of series impedance circuits/devices, example auto-transformers and rectifier system to which the series impedance circuits/devices connect, and combined low harmonic rectifier and converter (LHRC) devices/systems. Three different designs of series impedance circuits and devices (where enclosed in an external casing) are respectively illustrated by FIGS. 1A, 1B and 1C and described below. The first embodiment, illustrated by FIG. 1A provides a series impedance circuit 100 and series impedance device 101, which may also be referred to as a first or first-type impedance circuit/device. In a second and third embodiments illustrated by FIGS. 1B and 1C, two different configurations (i.e., a first configuration and a second configuration) of variable series impedance circuits/devices are provided. These variable series impedance circuits are also referred to as a second or second-type impedance circuit/device. Further delineation amongst the two variable circuits are provided by specifically describing which configuration of the two variations is currently being referred to.

FIGS. 1A, 1B, and 1C each provide two schematics, with the left most schematic representing the circuit configurations of the example series impedance circuits 100, 150, 160 covering the specific implementation which utilizes current transformers. The right-most schematic in each figure then represents a device view (i.e., series impedance device 101, 151, 161), in which the electrical wiring and components that make up a series impedance path are housed within some form of external casing from which protrudes the input and output connectors/leads/terminals. While the presented device views 101, 151, 161 provide a similar internal schematic of current transformer and serially-connected inductance and capacitance, according to the illustrative embodiments described herein, the device view 101, 151, 161 (and in particular the device views of FIGS. 3 and 5) further represents the embodiments in which the functional features of the invention are provided regardless of the specific usage/configuration of components within the series impedance devices, which components do not necessarily include a current transformer.

Figure 4A:
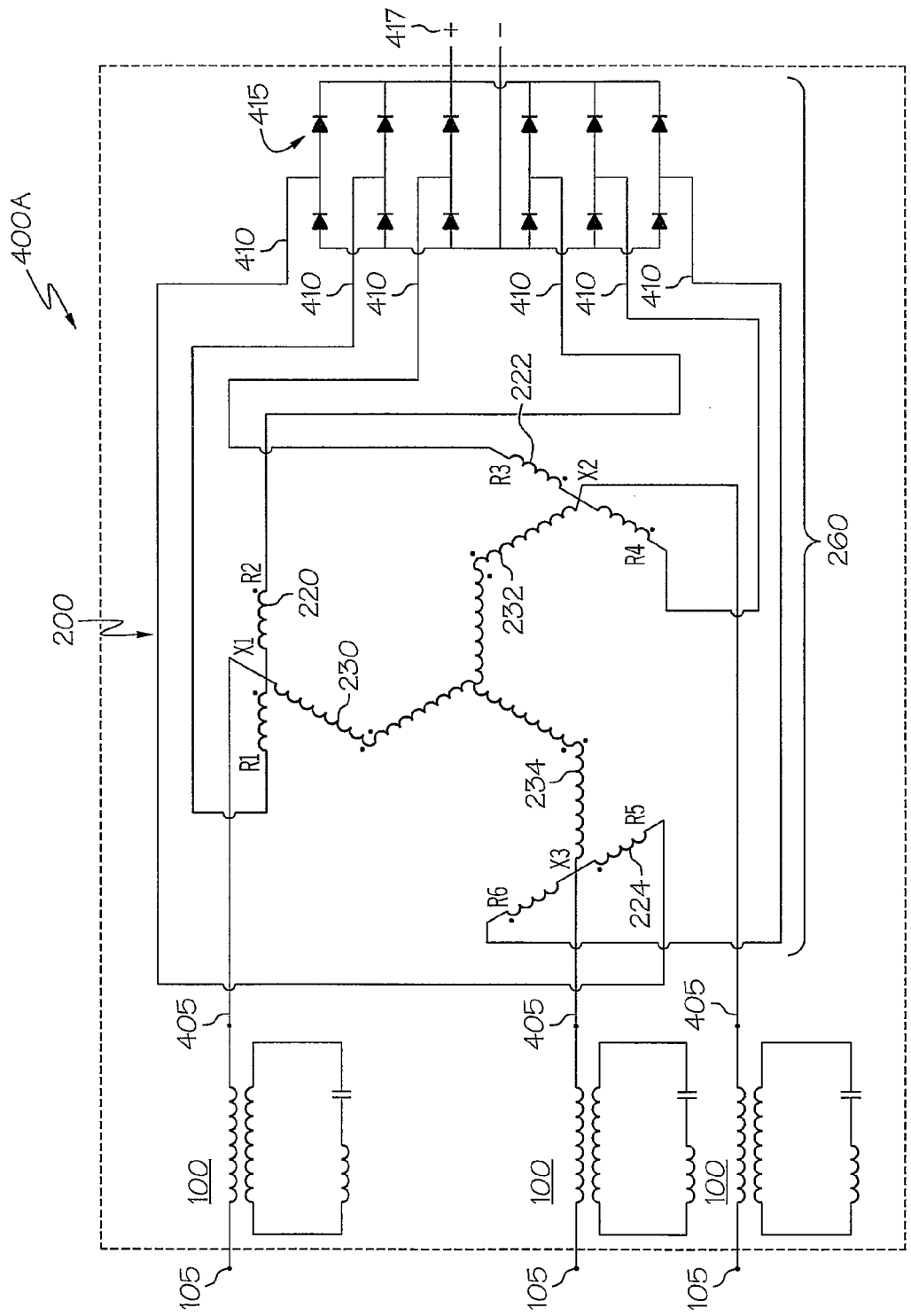
FIG. 4A illustrates an example configuration of a low harmonic rectifier circuit (LHRC) comprising a rectifier system/device, with a phase shifting auto transformer that is connected at each power input with a fixed series impedance circuit, according to one implementation of the present invention.

As depicted in FIG. 1A, fixed series impedance circuit 100 (and similarly configured device 101) comprise current transformer 110, with a primary and secondary winding. The secondary winding of fixed series impedance circuit is coupled in series (at respective first and second ends of the secondary winding) to serially-connected inductance 120 and capacitance 130 to form a closed loop The serially-connected components form the lower loop of components of FIG. 1A. The ends of the primary (upper) winding of the current transformer 110 provide the input and output terminals for series impedance circuit/device 100/101. Specifically, as illustrated by FIG. 4A, described in detail hereafter, the input and output leads and/or terminals of the primary winding serve as the connection points for one branch of the three phase power supply (not shown) and one input to the auto transformer of the rectifier system/device. Thus, power input connector 105 serves as the connecting (input) point/terminal/lead for one leg of the three phase power supply output, while output connector 107 serves as one of the connection points/terminals/leads for one of the three three-phase input terminals of the primary transformer. These connections are shown in greater detail in FIGS. 4A-4B-4C. In one embodiment, the current transformers of the series impedance circuits are constructed on a three-phase core, and the inductors are constructed as three phase inductors.

FIG. 1B illustrates the second embodiment depicting a first configuration of variable series impedance circuit 150 and series impedance device 151 (i.e., second or second-type series impedance circuit/device). As shown with the variable series impedance circuit/device 150/151, the current transformer 115 is a selectable/adjustable ratio transformer, which is constructed with an adjustable ratio mechanism 125 used for changing the effective ratio of the transformer. The adjustable ratio mechanism 125 is either manually adjustable (using adjustable ratio control 155) or automatically adjustable. As an example, the adjustable ratio mechanism 125 may be, but is not limited to, a bridging tap changer connected at a break in the transformer winding(s). The manually adjustable version of adjustable ratio mechanism 125 may incorporate a manual tap switch or a terminal board, while the automatically adjustable version of adjustable ratio mechanism 125 may incorporate a solid state switch. As with the fixed series impedance circuit/device 100/101 (FIG. 1A), current transformer 115 of variable series impedance circuit/device 150/151 has a secondary winding coupled in series at respective first and second ends to serially-connected inductance 120 and capacitance 130. The serially-connected components form the closed loop of components with the secondary winding. The input lead from the variable switch and the output lead of the primary winding of the current transformer 110 provide the input and output connectors/terminals for variable series impedance circuit 150. Power input connector 105 serves as the connecting (input) point for one leg of the three phase power supply output, while output connector 107 serves as one of the connection points for one of the three-phase input terminals of the primary transformer circuit. While a specific example of the adjustable ratio arrangement is illustrated and described herein, the invention may further be implemented utilizing other adjustable ratio arrangements, which may be discerned by those skilled in the art.

FIG. 1C illustrates the second configuration of a variable series impedance circuit. As shown with variable series impedance circuit/device 160/161, the current transformer 115 is a selectable/adjustable ratio transformer, which is constructed with an adjustable ratio mechanism 125, used for changing the effective ratio of the transformer. Different from series impedance circuit/device 100/101 and the first configuration of variable series impedance circuit/device 150/151, however, the second configuration of variable series impedance circuit/device 160/161 includes adjustable ratio mechanism 125 on the serially-connected secondary windings. The adjustable ratio mechanism 125 is either manually adjustable (using adjustable ratio control 165) or automatically adjustable. As an example, the adjustable ratio mechanism 125 may be, but is not limited to, a bridging tap changer connected at a break in the transformer winding(s). The manually adjustable version of adjustable ratio mechanism 125 may incorporate a manual tap switch or a terminal board, while the automatically adjustable version of adjustable ratio mechanism 125 may incorporate a solid state switch. As with the fixed series impedance circuit/device 100/101 (FIG. 1A), current transformer 117 of variable series impedance circuit/device 160/161 has a primary winding and a secondary winding. The secondary winding has first and second leads/ends connected in series to inductance 120 and capacitance 130. The serially-connected components form the closed loop of components of FIG. 1C. Power input connector 105 serves as the connecting (input) point/terminal/lead for one leg of the three phase power supply output, while output connector 107 serves as the connection point/terminal/lead for one of the three three-phase input terminals of the primary transformer circuit.

In both configurations of variable series impedance circuits/devices 150/151, 160/161, the adjustable ratio mechanism enables the manual or automatic adjustment of the transformer's input-to-output operating characteristics to cause a different harmonic control of a connected primary transformer and/or rectifier system. While a specific example of the adjustable ratio arrangement is illustrated and described herein, the invention may further be implemented utilizing other adjustable ratio arrangements, which fall within the scope of the invention.

Additionally, as illustrated by the device view for each series impedance circuit of FIGS. 1A-1B-1C, each circuit may be represented/provided as a single component with an external casing/housing and two connectors (or terminals), representing power input connector 105 and output connector 107, respectively, extending from/on the exterior surface of the device. Additionally, with the first and second configurations of the variable series impedance circuits, an adjustable ratio control 155/165 of the adjustable ratio mechanism 125 is also disposed on the surface (or accessible from the outside) of the device housing/casing. The availability of the series impedance circuits as actual complete devices enable the devices 101/151/161 to be purchased as off-the-shelf units and connected to the transformer inputs of an existing (or newly manufactured/configured) rectifier system.

Utilization of a specific type of series impedance circuit is primarily a design choice, with the adjustable/variable circuit configurations (150/160) necessarily providing greater flexibility (than the fixed circuit configuration) for adjusting the characteristics of the series impedance circuit and/or the rectifier device to which the series impedance circuit is attached. These adjustments to the current transformer ratio may be based on the amount of rectifier loading, or known characteristics of the power supply, the series impedance circuit, and/or characteristics of the rectifier system/device to which the power supply is ultimately applied. Further, while illustrated using a single capacitor and single inductor, the capacitance and inductance of each series impedance circuit may be achieved via a combination of different components/devices in any configuration (e.g., parallel combination and series combinations) that collectively provide the desired total/applied capacitance and/or inductance.

Those skilled in the art appreciate the different methods for providing an applied capacitance and/or inductance utilizing one or more circuit devices (e.g., capacitors and inductors), whether connected in series or parallel, or utilizing characteristics of different electrical elements/components to achieve the applied capacitance and/or inductance). For simplicity in describing the various embodiments, all references hereinafter to series impedance circuit will be assumed to refer to any one of the different types/configurations of series impedance circuits (i.e., 100/150/160) and/or the equivalent device (101, 151, 161), since the embodiments allow for the different types of series impedance circuits/devices to be interchangeably utilized within/with any given rectifier system.

It will be obvious to those skilled in the art that certain relative values of inductance and capacitance will cause the series impedance to be frequency dependent, which is advantageous in the practical implementation of the series impedance circuit/device. Also, the impedance at the fundamental frequency power supply can be very low when the impedance of the inductor is approximately canceled (counteracted) by the impedance of the capacitor at the power supply frequency. Impedance in ohms of an inductor is expressed as [2×pi× frequency (in hertz)×inductance (in Henrys)]. The impedance in ohms of a capacitor is express as 1 divided by [2×pi× frequency (in hertz)× capacitance (in Farads)].

It will be obvious to those skilled in the art that the primary winding of the current transformer will have frequency dependent impedance that is a direct function of the series inductance and capacitance connected to the secondary winding. The series impedance seen by the current flowing through the primary winding is the impedance of the series-connected inductance and capacitance multiplied by the square of the turns ratio (effective number of primary turns divided by the effective number of secondary turns) of the current transformer. With the presented embodiments, the impedance of the series impedances paths, at the power supply frequency, (which exhibits inductance and capacitance) can be much lower than the impedance of the inductor alone, while, at higher frequencies, the impedance can increase up to approximately equal to the impedance of the inductor alone.

As presented hereinafter, the first illustrations (FIGS. 4A-4B-4C) of the current-transformer implemented series impedance circuits coupled to example rectifier systems/devices will provide both implementations (i.e., fixed and variable) of the series impedance circuits, while the subsequent illustrations (FIGS. 5-8) will simply provide series impedance circuit 100, represented generically as a box (or casing), similar to the impedance devices illustrated by FIGS. 1A, 1B and 1C, with protruding connectors/terminals for connection thereto. These later illustrations of the series impedance devices further highlights the availability of the series impedance circuits (regardless of the actual components and/or configuration thereof within the devices themselves) as off-the-shelf, pre-manufactured/pre-packaged devices, with the circuit components interconnected inside of an external casing from which a power input terminal/lead/connector and an output terminal/lead/connector protrude. The off-the-shelf device may then be coupled between the inputs of the transformer and the power supply terminals, without consideration for the actual circuitry within the packaged device.

Figure 3A:
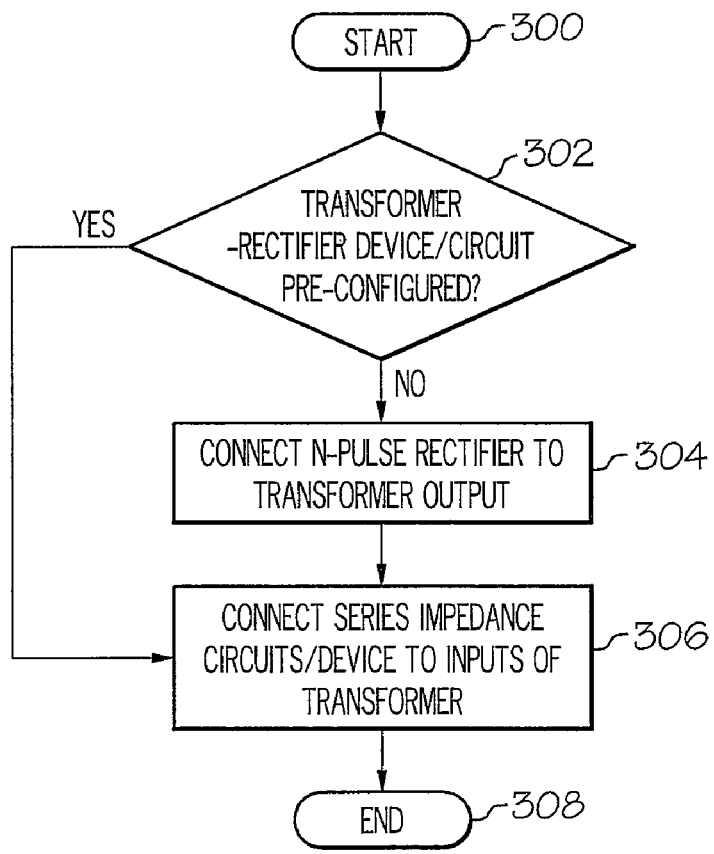
FIG. 3A is a flow chart illustrating the method for reducing higher order and lower order harmonics for a multi-pulse rectifier system utilizing series impedance circuits, according to the illustrative embodiments.
Figures 3B, 3C:
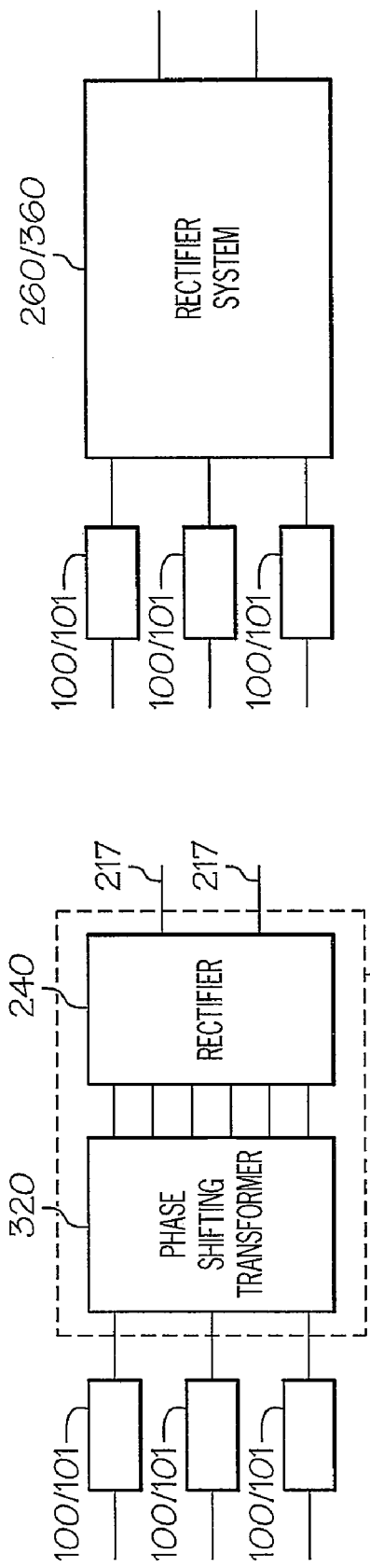
FIG. 3B is a block diagram illustrating series impedance paths/circuits/devices coupled to the inputs of a phase shifting transformer, which provides N inputs to a rectifier within of a rectifier system, according to one embodiment of the invention.
FIG. 3C is a block diagram illustrating series impedance paths/circuits/devices coupled to a pre-assembled rectifier system, according to one embodiment of the invention.

Referring now to FIG. 3A, there is illustrated a flow chart depicting an example method by which lower and higher order harmonics are reduced in a rectifier system/device by the introduction of series impedance paths between a three phase power supply and the power input terminals of the three phase, phase shifting transformer 320 of a rectifier system 360. Specifically, as illustrated by FIGS. 3B and 3C, introduction of a series impedance path involves the connection of one or more devices (e.g., series impedance device 101/151/161) at the power input terminals/leads of the phase shifting transformer 320. In a more specific implementation, the series impedance device(s) utilized is/are series impedance circuits (100/150/160), according to the described and illustrated embodiments. The process of FIG. 3 begins at block 300 and proceeds to block 302 at which a determination is made whether the rectifier system 260/360 is already constructed/designed (i.e., whether the phase-shifting-transformer 320 is already attached to the input of a multi-pulse (or N-pulse) rectifier 240). If the rectifier system 260/360 is not already constructed/designed, the process moves to block 304 at which a phase shifting transformer (or design thereof) 320 is selected along with the N-pulse rectifier 240 and the rectifier system 360 constructed/designed by coupling the outputs of the phase shifting transformer 320 to the inputs of the rectifier 240. For a more specific example of the implementation of the block 304, in one embodiment, a designer (via a machine-operated process or human-operated process) couples an input of a 12-or-higher pulse rectifier (240) to an output of a three phase-to-N phase output transformer (320), where N represents the number of inputs to the rectifier.

The rectifier systems/devices each comprise a multiple phase primary transformer and a connected multi-pulse rectifier. The series impedance circuits are coupled via their respective primary windings to the three inputs of the primary transformer. The outputs of the primary transformer are coupled to inputs of a twelve pulse rectifier (converter) and supplies power to the twelve-pulse rectifier. The twelve-pulse rectifier may incorporate simple diodes or may incorporate other rectifier types such as SCRs (silicon-controlled rectifiers). In one embodiment, the primary transformer comprises one or more three phase, ziz-zag connected, phase shifting auto-transformers.

In one embodiment, the primary transformer is a zig-zag connected, phase shifting, auto-transformer. The primary transformer may be a three-phase to six-phase (phase shifting) transformer. The auto-transformer provides the inherent ability to block the flow of zero sequence currents that are associated with multiple-pulse rectifiers. The transformer coils are wound in three separate, multi-wound windings on three single-phase cores. A vector oriented winding scheme is provided with three output windings and three internal zig-zag configured pairs of windings. The three internal zig-zag windings are each connected at one end of a first winding to form an electrical neutral. The three output windings each have a first endpoint and an opposed second endpoint. Each set of three first endpoints and three second endpoints represent connection points at which the transformer output connects to one half of the inputs of a twelve-pulse rectifier. In other embodiments, these endpoints are coupled to the inputs of one or more serially connected auto-transformers to yield a multi-level auto-transformer circuit, which further enables 24-pulse rectification and other ranges of rectification.

Throughout the description of the embodiments herein that utilize a current transformer within the series impedance path, references are made to the type of phase shifting transformer being utilized as the primary transformer within the rectifier system. In the following illustrative embodiments, the ability of the impedance circuits or devices to reduce the lower order harmonics is further enhanced by the use of a specific design of a zig-zag configured phase shifting, auto-transformer within the rectifier device. These auto-transformers further increase the reduction in the lower order harmonics within the rectifier system. The functionality of the auto-transformers is made possible through the zig-zag wiring configuration provided by the coil circuits illustrated by FIG. 2A. Referring to the figure, a vector oriented winding schematic 200 is illustrated with various endpoints (representing the input and output points for each pair of windings) indicated by numbered letters Xn and Rn, respectively. Three output windings 220, 222, 224 and three internal zig-zag configured pairs of windings 230, 232, 234 are provided.

The three output windings each have a first and second endpoint, labeled even to odd numbered subscript of R (i.e., R1-R2, R3-R4, and R5-R6). The three internal zig-zag pairs 230, 232, 234 are connected at corresponding ends of a first winding to form an electrical neutral Z. The opposing end of the second winding of each of the three internal pairs of windings 230, 232, 234 are respectively connected to a tap on one of the output windings 220, 222, 224. In this illustration, the tap of each of the output windings 230, 232, 234 is also the point of contact (X1, X2, and X3) for respective ones of the transformer input terminals (to which an output terminal of a series impedance circuit 100 is connected).

The phase shifting auto-transformer designed with the above winding schematic provides an inherent ability to block the flow of zero sequence currents associated with twelve pulse rectifiers, such as the rectifiers utilized in variable frequency drives. The transformer coils are wound in three separate, multi-wound coils on three single-phase cores. In alternate embodiments, the transformer coils are wound on a four-leg or a five-leg, three-phase core. Notably, the illustrative embodiments do not provide a three-leg, three-phase core because the zero sequence blocking voltage is in phase in all three coils and a three-leg core does not have a closed magnetic path to complete the zero sequence magnetic circuit.

Figure 2B:
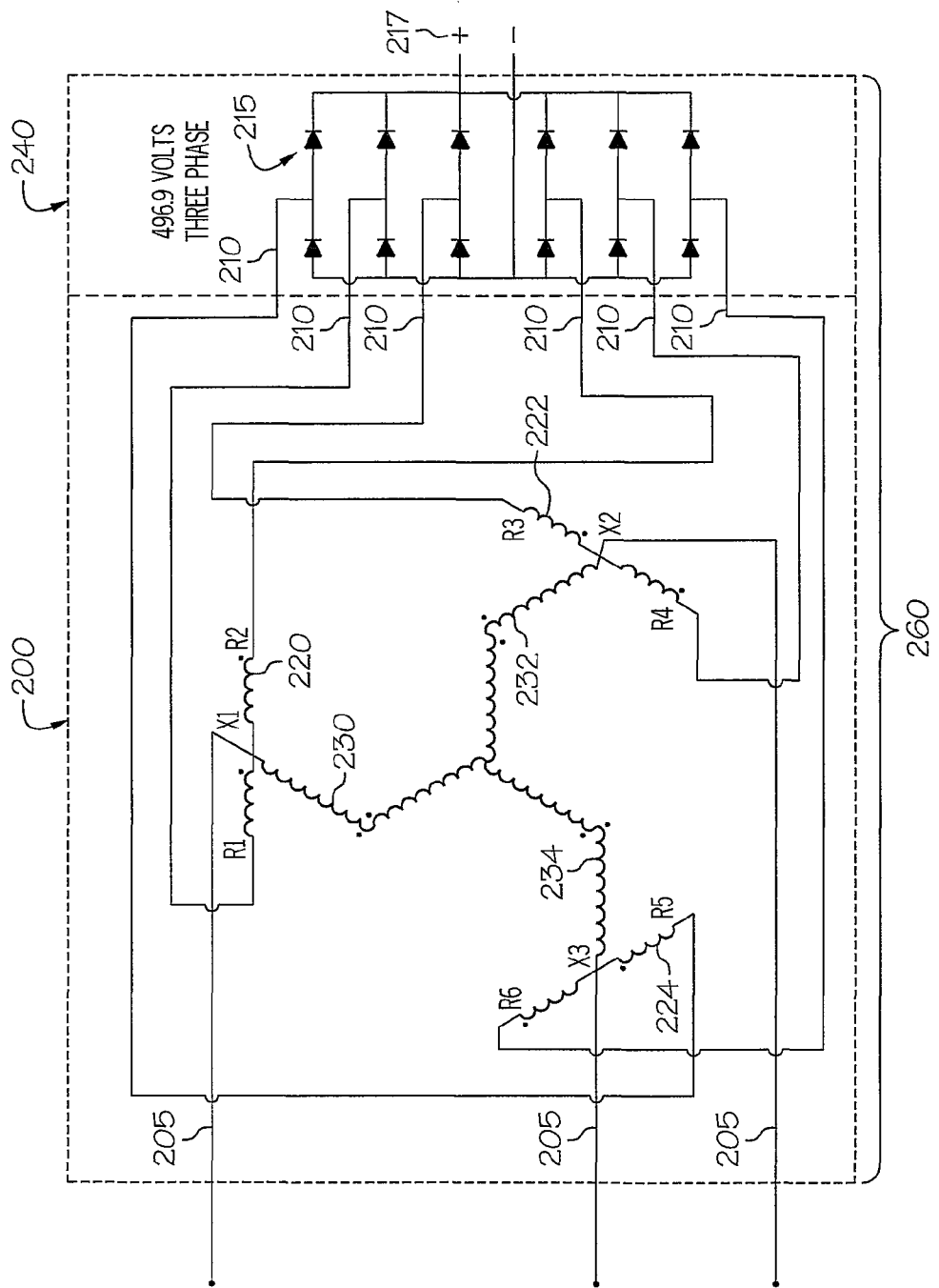
FIG. 2B is a schematic of an example rectifier system/device comprising an auto-transformer with N output terminals/leads connected to a 2N-pulse rectifier, as is utilized within various embodiments of the invention.

FIG. 2B illustrates an example rectifier system with zig-zag connected auto-transformer that is utilized to complete the example LHRC devices described herein. The transformer of the illustrative embodiments generally includes at least three input terminals arranged for electrical connection to a three phase power source (via three series impedance devices, in the described embodiments) and at least six output terminals arranged for electrical connection to an external multiple phase load. Additionally, the transformer comprises a first coil, a second coil and a third coil, each containing at least a first isolated winding, a second isolated winding and a third isolated winding. Each isolated winding has at least a first endpoint and a second endpoint, and each of the third windings is tapped.

The first ends of the first windings of the first, second and third coils are electrically connected together to form an electrical neutral. The second winding of the first coil is electrically connected to the tap of the third winding of the second coil. The second winding of the second coil is electrically connected to the tap of the third winding of the third coil. Likewise, the second winding of the third coil is electrically connected to the tap of the third winding of the first coil.

Additionally, the second end of the first winding of the first coil is electrically connected to the second end of the second winding of the second coil, the second end of the first winding of the second coil is electrically connected to the second end of the second winding of the third coil, and the second end of the first winding of the third coil is electrically connected to the second end of the second winding of the first coil. The endpoints of each of the three third windings are connected to a separate one of the (at least six) rectifier input terminals.

In one embodiment, the transformer is constructed using single phase cores, while in another embodiment the transformer is constructed using a five legged three phase core. Irrespective of the particular core type being utilized, the first end of the second winding of the first coil is electrically connected to the tap of the third winding of the second coil. The first end of the second winding of the second coil is electrically connected to the tap of the third winding of the third coil, and the first end of the second winding of the third coil is electrically connected to the tap of the third winding of the first coil.

Several alternate embodiments are provided for connecting the three input terminals to the transformer windings. In a first embodiment, the tap of each the third winding is electrically connected to a separate one of the at least three input terminals. In a second embodiment, the second windings are tapped at corresponding points, and each tap of the second windings is connected to a separate one of the at least three input terminals. With this second embodiment also, the first end of the second winding of the first coil is electrically connected to the tap of the third winding of the second coil, the first end of the second winding of the second coil is electrically connected to the tap of the third winding of the third coil, and the first end of the second winding of the third coil is electrically connected to the tap of the third winding of the first coil.

In a third embodiment in which the second windings are also tapped at corresponding points, the tap of the second winding of the first coil is electrically connected to the tap of the third winding of the second coil, the tap of the second winding of the second coil is electrically connected to the tap of the third winding of the third coil, and the tap of the second winding of the third coil is electrically connected to the tap of the third winding of the first coil. With this configuration, each of the first ends of the second windings is electrically connected to a separate one of the at least three input terminals.

Thus, while the primary transformers described herein may be of any number of configurations/types of transformers; the illustrative embodiments provide zig-zag connected auto-transformers 200, which exhibit certain beneficial low harmonic characteristics to further complement the reduced harmonic effects of adding the series impedance circuits to the inputs of the rectifier systems. Specifically, these zig-zag connected auto-transformers exhibit an inherent ability to block the flow of zero sequence currents associated with multiple-pulse rectifiers. The combination of the series impedance devices (100/150/160) with these transformers 200 provide the functionality of reducing both lower order and higher order harmonics for a rectifier circuit.

Figure 8:
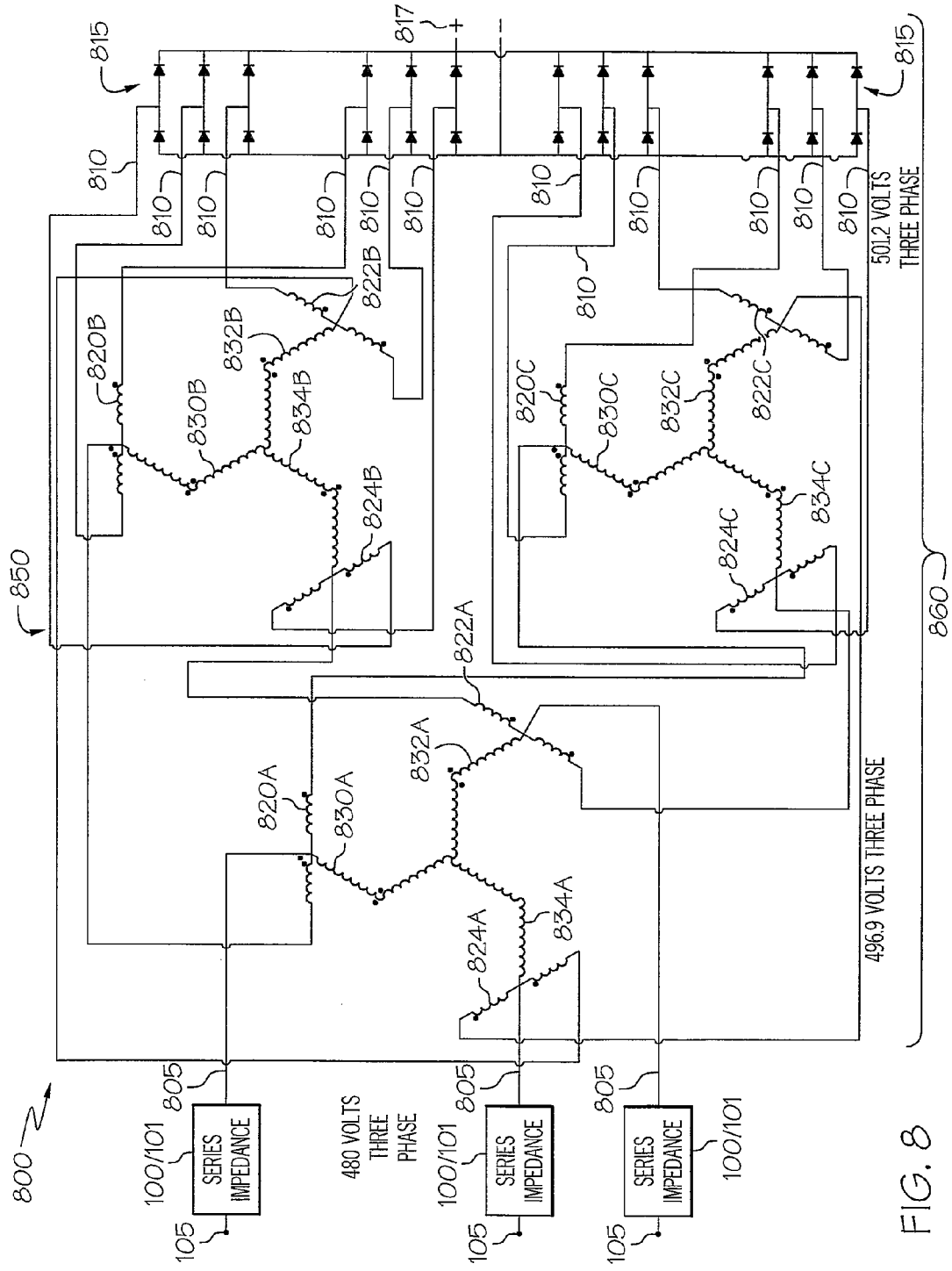
FIG. 8 is a schematic illustrating a LHRC having a rectifier system/device with a multi-level auto-transformer, which has a plurality of series impedance paths connected to the power input terminals/leads of the auto-transformer, according to one embodiment of the present invention.

In one embodiment, and as illustrated by FIG. 8, described hereafter, multiple levels of connected transformers may be utilized, coupled in series and/or parallel configuration to power the N-pulse rectifier. The number and configuration of the transformers is a design choice, based on the size of the rectifier and harmonic and other performance characteristics desired. In the illustrative embodiments described herein, the transformers are zig-zag connected, auto-transformers and are designed according to one of the wiring configurations described above (or as an equivalent thereof), with internal windings configured as illustrated by the transformer wiring schematics provided herein. Notably, while the various embodiments illustrated and described herein reference a zig-zag connected, phase shifting, auto-transformer as the primary transformer, the functional features of the invention also apply to other phase shifting transformer types, including for example, an isolation type phase shifting transformer.

Returning again to FIG. 3A, at block 306, series impedance circuit(s)/device(s) 100/101 are designed/manufactured and coupled at the output connectors to the input connectors of the phase shifting transformer 320 (FIG. 3B) and/or rectifier system 260/360 (FIG. 3C). The series impedance circuits may be any one of the various configurations of series impedance circuits described herein or their equivalents. This coupling of the series impedance circuit(s)/device(s) to the rectifier system/device completes the design and configuration of the low harmonic rectifier and converter (LHCR) system, and the process ends at block 308. Returning to the specific example, with the transformer output connected to the rectifier input, the manufacturer/designer also connects a series impedance circuit 100/101 to each of the inputs of the phase shifting transformer 320. The eventual user of the device connects a power source's three phase inputs to the respective power input of the series impedance circuits. The series impedance circuits 100/101 thus connect in series with the specific single input of the primary transformer (320) and to one of the three output terminals of the power source, when the power source is connected.

With this connectivity of the series impedance circuit, one or more levels of transformers (or auto-transformers), and the multi-pulse rectifier, the rectifier may be powered by a three phase power source to provide rectification with substantially-reduced higher order harmonics (as well as reduced lower order harmonics when the auto-transformer of the type described herein is utilized) and without substantially reducing the magnitude of the DC voltage of the power source seen at the output of the rectifier.

As noted by decision block 302, the beneficial functionality provided by the present invention applies to embodiments in which the rectifier system/device is pre-configured or pre-designed. More importantly, however, the novel functionality provided by the disclosed embodiments further applies to rectifier systems that may already be installed in the field. Thus, by simply connecting a series impedance circuit/device to each one of the power input paths connecting to the three phase transformer input, the reduction in higher order harmonics and other enhancements attributable to the series impedance circuit/device is made available within existing as well as newly configured/designed rectifier systems/devices.

With the above described method, higher order harmonics are substantially eliminated from the rectifier system that is powered by a power source with power inputs passing through the series-connected series impedance circuits/device. Notably, the above described method provides a numbered sequence of design steps. It is however appreciated that the order of completion of each step is not important to the ultimate novelty provided, and as such, the presentation order should not be considered as a limitation on the invention.

Figure 4B:
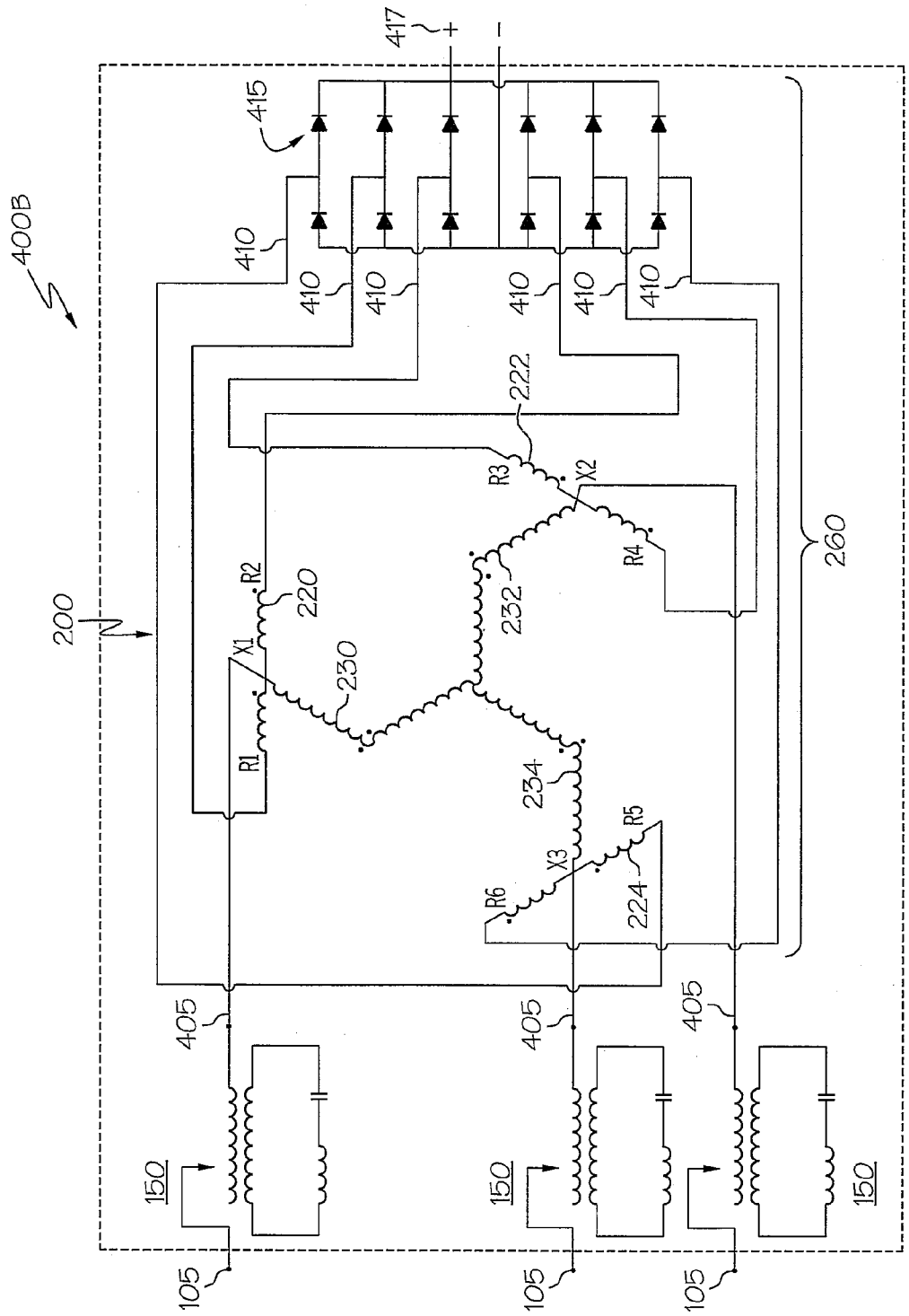
FIG. 4B illustrates another example configuration of a low harmonic rectifier circuit (LHRC) comprising a rectifier system/device, with the phase shifting auto transformer's inputs connected to a first configuration of a variable series impedance circuit, according to one implementation of the present invention.
Figure 4C:
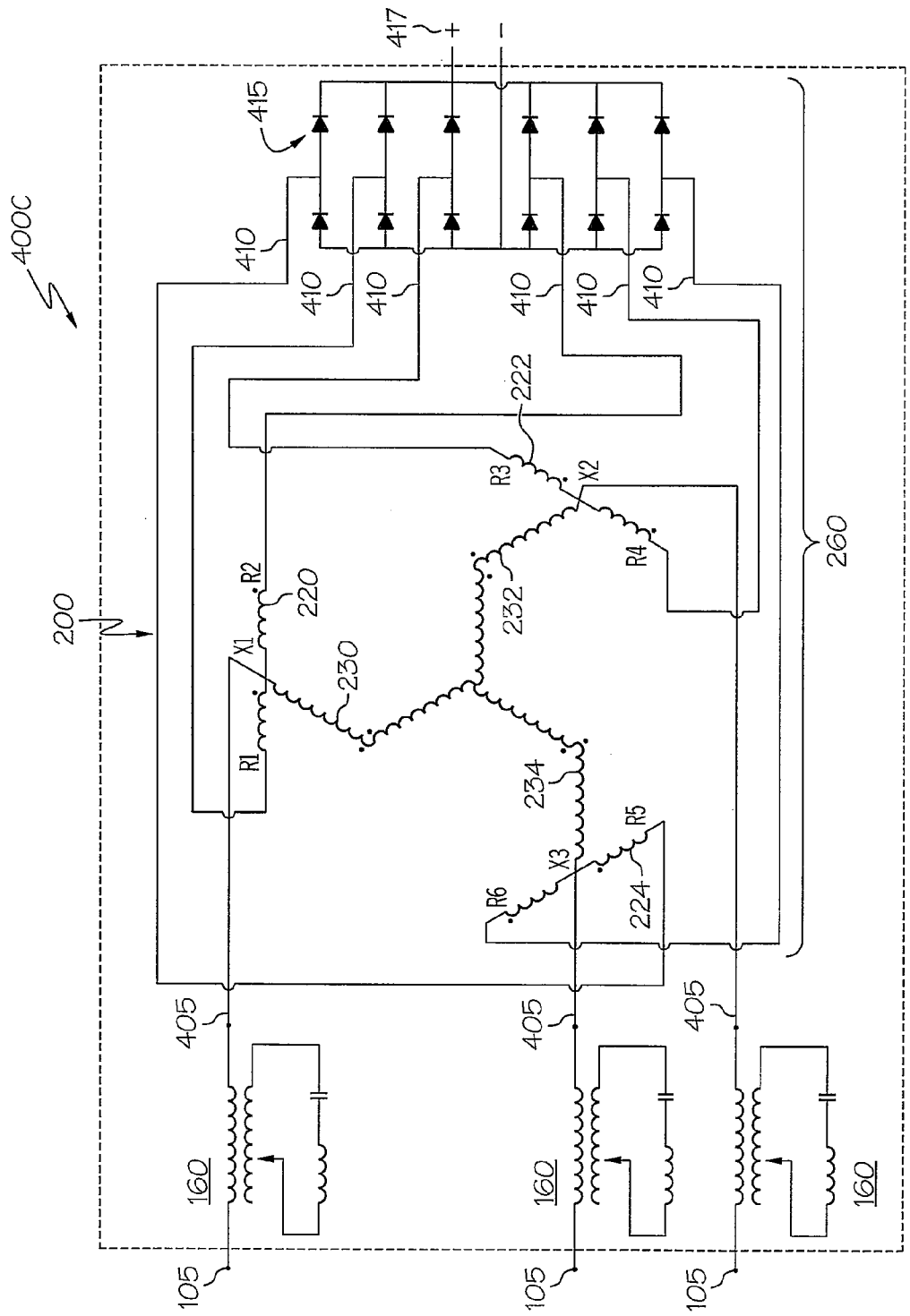
FIG. 4C illustrates another example configuration of a low harmonic rectifier circuit (LHRC) comprising a rectifier system/device, with the phase shifting auto transformer's inputs connected to a second configuration of a variable series impedance circuit, according to one implementation of the present invention.
Figure 6:
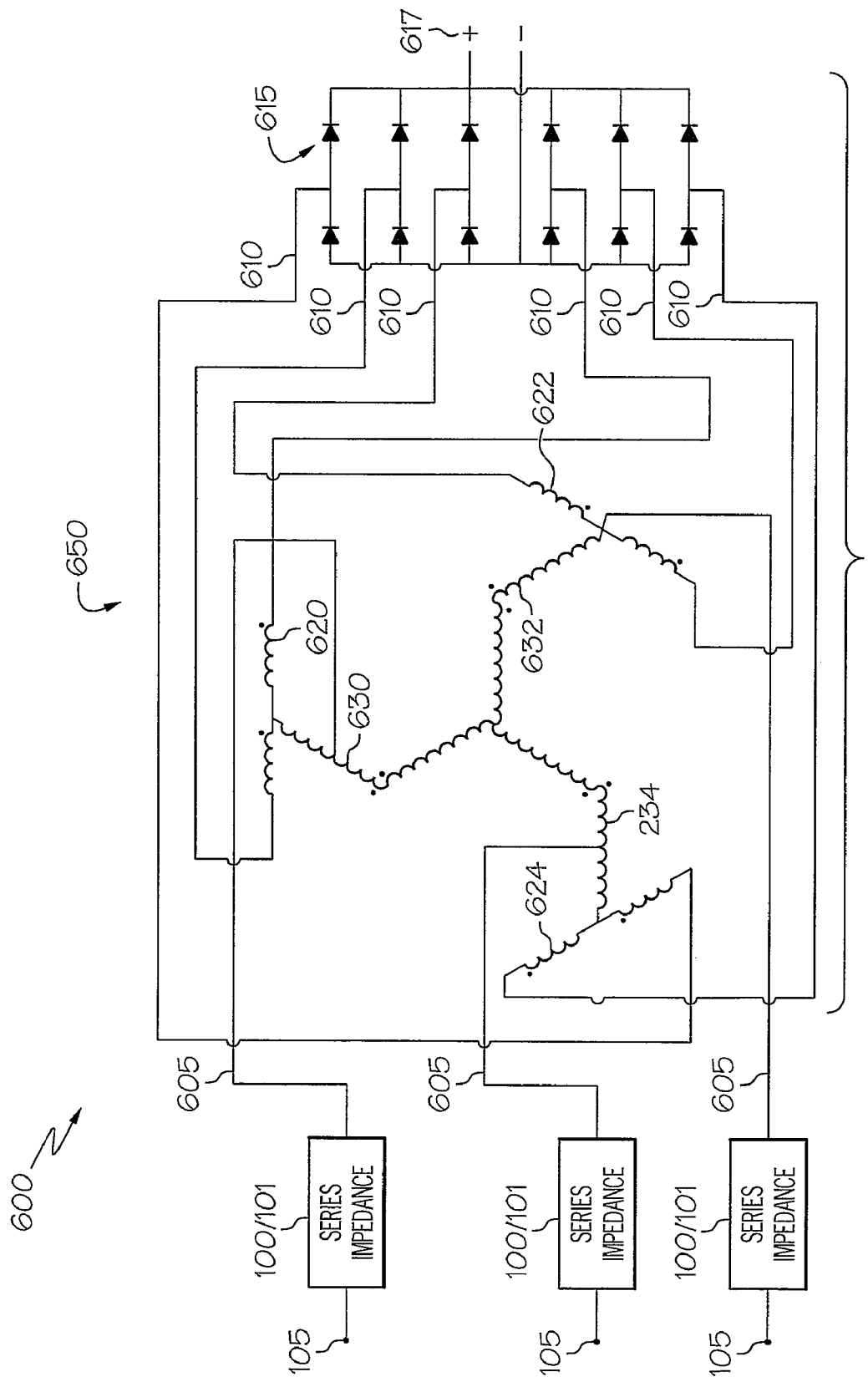
FIG. 6 illustrates a different embodiment of a LHRC in which the rectifier system/device is configured with a different zig-zag connected, phase-shifting auto-transformer, which has a plurality of series impedance paths connected to the power input terminals/leads of the auto transformer, where the no-load output voltage generated is higher than the power system voltage received, according to another embodiment of the present invention.
Figure 7:
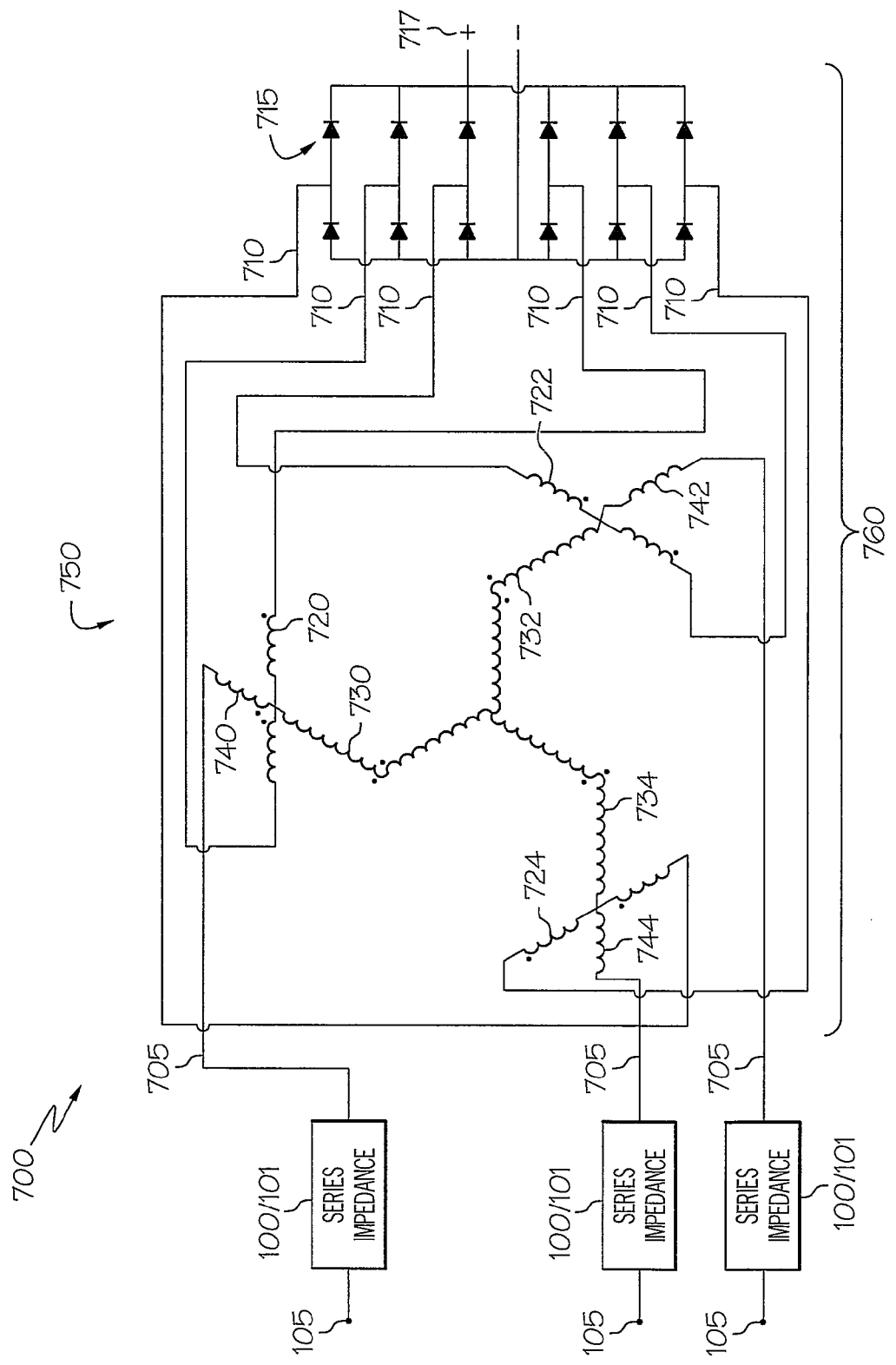
FIG. 7 illustrates another embodiment of a LHRC in which the rectifier system/device is configured with a different phase-shifting auto-transformer which has a plurality of series impedance paths connected to the power input terminals/leads of the auto transformer, where the no-load output voltage generated is lower than the power system voltage received, according to another embodiment of the present invention.

Turning now to FIGS. 4A, 4B and 4C, there are illustrated three examples of the assembled low harmonic rectifier circuit 400 utilizing respective ones of the fixed and variable series impedance circuits (100/150/160) coupled to the inputs of primary, three-phase transformers that power N-pulse rectifiers. Specifically, three embodiments of the LHRC 400A-C with series impedance circuits 100/150/160 coupled to the same auto-transformer design within a rectifier system are illustrated by FIGS. 4A, 4B and 4C. FIGS. 6-8 then illustrate the utilization of series impedance circuits/designs with various other auto-transformer designs within rectifier systems. Each embodiment illustrates a different variation of the configuration of internal coils/windings of the auto-transformers. A more complete set of auto-transformer configurations is provided in U.S. Pat. No. 7,049,921, and that grouping of different auto-transformer configurations is incorporated herein by reference as possible transformer types (among others) that may be utilized within examples of low harmonic converter devices.

As shown in FIGS. 4A-4B-4C, LHRC 400 comprises series impedance circuits 100/150/160 coupled to the power input terminals/leads of auto-transformers 200 having N outputs and which is in turn coupled to a 2N-pulse rectifier. In each of the described embodiments, each output connector 107 of series impedance circuits 100/150/160 is coupled to an individual input terminal/connector of the primary transformer. Power input connector 105 of series impedance circuit then provides the power input terminal to which one leg of the three phase power supply (not shown) is connected.

FIG. 4A displays the wiring schematic of a first embodiment of a low harmonic converter device comprising zig-zag connected, phase-shifting auto-transformer 200, which is connected at its output terminals to a twelve-pulse rectifier 415 and at its input terminals to series impedance circuit 100. FIG. 4B displays the wiring schematic of a second embodiment of a low harmonic converter device with a zig-zag connected, phase-shifting auto-transformer 200, which is connected at its output terminals to a twelve-pulse rectifier 415 and at its input terminals to a first configuration of variable series impedance circuit 100. FIG. 4C then displays the wiring schematic of a second embodiment of a low harmonic converter device with a zig-zag connected, phase-shifting auto-transformer 200, which is connected at its output terminals to a twelve-pulse rectifier 415 and at its input terminals to a second configuration of variable series impedance circuit 100. As illustrated within each figure, each of the three output windings 220, 222, 224 (i.e., R1-R2, R3-R4 and R5-R6) carries the current associated with the six wires 410 connected to the twelve pulse rectifier 415, and each of those windings 220, 222, 224 are designed for the voltage and phase relationship required by rectifier 415. Further, each of the output windings 220, 222, 224 is tapped by the end of the second winding of one of the internal windings 230, 232, 234.

In FIGS. 4A, 4B and 4C, X1, X2, and X3 represents the point of contact for the three-phase input to the particular transformer, which input has been passed through respective ones of connected series impedance circuits 100. The actual location of X1-X3 changes with the specific design of the transformer(s) illustrated. Each of the six windings (i.e., the three internal pairs of windings) of auto transformer, which are connected in a zig-zag pattern between X1, X2, and X3, carry currents appropriate to match the effective ampere turns flowing in the windings terminated at R1 through R6. Also, together the six zigzag connected windings are designed to operate at the voltage applied to input points X1, X2, and X3.

In the base designs of auto-transformers utilized within LHRC 400 (e.g., FIGS. 4A, 4B and 4C), R1, R3, and R5 (corresponding first endpoints) represent output leads/connectors 410 to one half of the twelve-pulse rectifier 415, and R2, R4, R6 (corresponding second endpoints) represent output leads/connectors 410 to the other half of the twelve-pulse rectifier 415. Another set of auto-transformer designs (e.g., FIG. 8) utilize these endpoints as inputs to another level of auto-transformers to enable 24-pulse rectification. This multi-level transformer subsystem enables advanced levels of rectification. Additional configurations are also contemplated, such as ones in which the auto-transformer is utilized for 18-pulse rectification.

Each input terminal of a three phase input power source (or input voltage), not specifically shown, is connected (at power input connector 105) to a series impedance circuit 100, which then connects (via output connector 107, FIG. 1) to the windings at respective inputs X1, X2, and X3. In the illustrative embodiment, an input voltage of 480 Volts is applied. Output voltage terminals 417 extending beyond the 12-pulse rectifier 415 enable attachment of a load to rectifier system 260. Within rectifier system 260, the no-load voltage at 410 is approximately 3.5% higher than the power system voltage (input voltage at primary transformer input connector 405). The 3.5% increase in output voltage falls within the delta of expected and acceptable rectifier operating limits. Also, higher order and lower order harmonics are substantially reduced.

As an extension of the previously described embodiments of series impedance devices 101/151/161 and as illustrated by single series impedance device (500) of FIG. 5A, all three of the series impedance circuits may be provided within a single external casing, with the three input terminals and three output terminals extending/protruding outside of the single external casing for connection to the three phase power supply and three input primary transformer, respectively. The three series impedance circuits may then be provided as a single series impedance device, which may be purchased off the shelf and connected via the extending connectors/terminals/leads between the power supply inputs and the inputs of the primary transformer of the rectifier system.

FIG. 5A further illustrates an alternate embodiment in which a single series impedance device (500) is provided. For simplicity, the single series impedance device is referred to herein as low harmonic impedance device 500. Low harmonic impedance device 500 contains the electrical equivalent (i.e., not necessarily the same configuration of components as the individual series impedance circuits/devices presented by FIGS. 1A-1B-1C) of three separate series impedance circuits. Low harmonic impedance device 500 provides harmonic reductions for each phase of a three phase power supply input to a primary transformer of a rectifier system. In the embodiments in which variable series impedance circuits are utilize within the low harmonic impedance device 500, one or more adjustable ratio controls 165 are provided external to (or accessible from the outside of) the casing of low harmonic impedance device 500 to enable changing of the operating characteristics (e.g., the impedance response) of the low harmonic impedance device 500. In one embodiment, a single, combination adjustable ratio control (165) may be provided to allow each leg of the three phase power input to receive the same variations in/to the impedance being applied by the respective (individual) variable series impedance circuits coupled to that leg of the power input and housed within the low harmonic impedance device 500. The changes in measured impedance and other characteristics affected by the adjustments that are made with the adjustable ratio mechanism (125), via the externally-accessible adjustable ratio control 165, ultimately affect the level of harmonic control provided for the rectifier system to which the low harmonic impedance device 500 is connected. While the adjustable ratio control 165 is illustrated herein (and in FIGS. 1B and 1C) as positioned external to the casing of the device (151/161/500), alternate embodiments exist in which the adjustable ratio control 165 may be located inside the casing, which may have a removable cover to allow access to the adjustable ratio control 165.

Figure 5B:
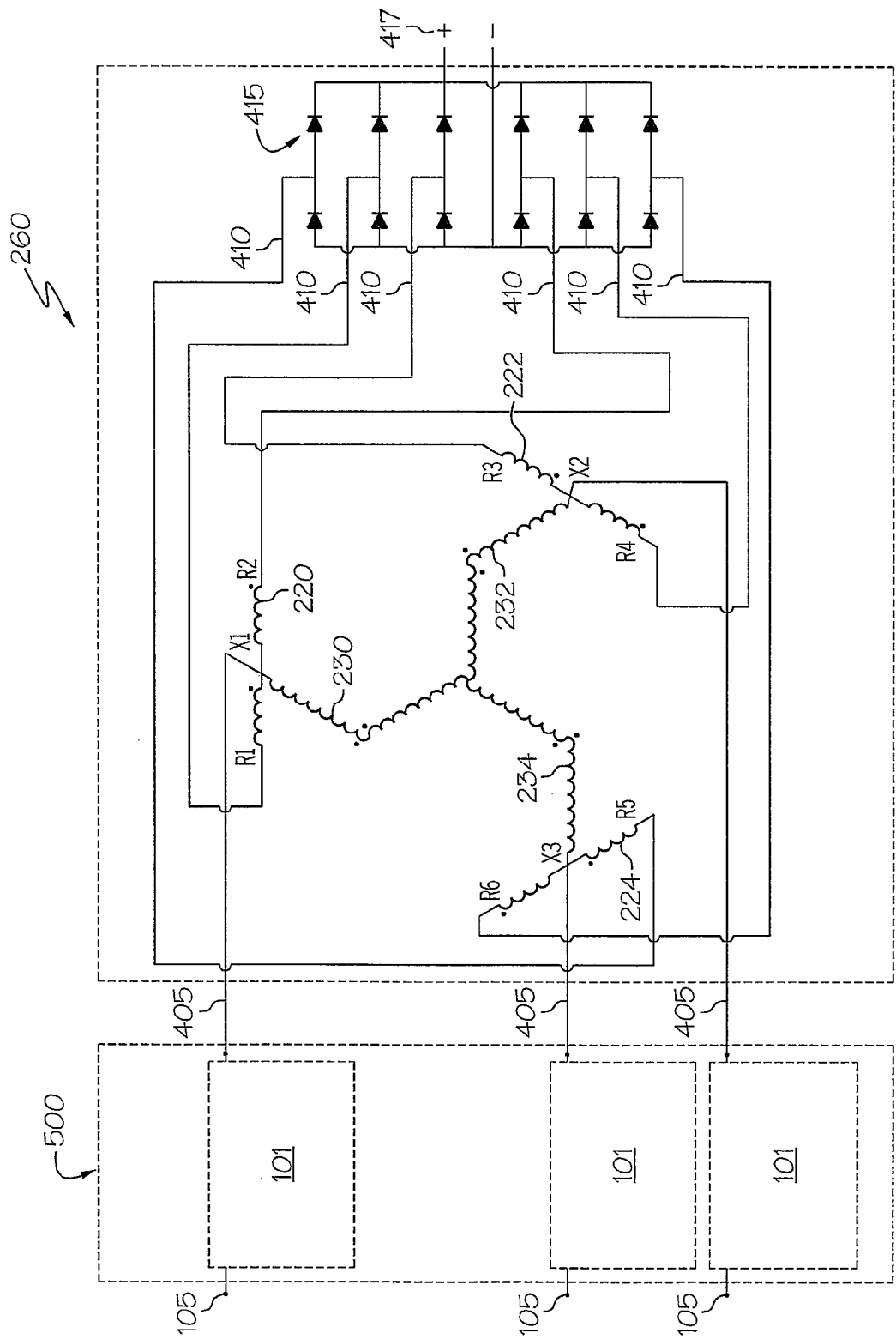
FIG. 5B illustrates two possible implementations whereby off-the-shelf series impedance devices are connected to power input terminals of a phase shifting auto-transformer of a rectifier system/device, in accordance with embodiments of the invention.

Generally, three different methods for configuring/implementing a LHRC are supported by the described embodiments, utilizing one configuration from among: (a) three series impedance circuits 100/150/160 coupled to a rectifier system; (b) three series impedance devices 101/151/161 (which include current transformers) coupled to the rectifier system; and (c) a single low harmonic converter device 500 coupled to the rectifier system. The first method/configuration is illustrated by FIGS. 4A-4C, described above. FIG. 5B illustrates the latter two methods/configurations as alternate embodiments in which low harmonic impedance device 500 or individual series impedance devices 101 is/are attached to the transformer inputs of rectifier system 260. Within the second alternate configuration, the functionality associated with the use of the series impedance circuits/device may be enabled or implemented via a single device (e.g., low harmonic impedance device 500) that provides the collective functions of having three individual series impedance circuits/devices coupled between a three phase power source and the three inputs of a primary phase shifting transformer of a rectifier system.

FIGS. 6 and 7 illustrate two different embodiments of auto-transformers 650, 750 that may be utilized within example LHRC devices 600, 700. As with the auto-transformers provided within the LHRC devices of FIGS. 4A-4B, the present auto-transformers 650, 750 have input terminals coupled to example series impedance circuits/devices 100/101, which circuits/devices may also be variable (FIG. 1B-1C). Also, the present auto-transformers 650, 750 are connected to respective twelve-pulse rectifiers to provide rectifier systems 660, 760. FIG. 6 displays a wiring schematic of a similar, zig-zag connected, phase-shifting auto-transformer as that of FIG. 4A. However, unlike FIG. 4A, the input terminals extending from series impedance circuit 100 are not connected at the tap of the output windings 620, 622, 624 (which also corresponds to the ends of the second windings of the internal winding pairs). Rather, the input wires (605) extending from series impedance circuits 100/101 tap corresponding ones of the second windings of the internal winding pairs 630, 632, 634. With this configuration, the no-load voltage at 610 is actually made higher than the voltage of the input power source 605. This embodiment is useful where the rectifier is designed for a certain rated voltage, such as 600 volts, and the power system available at the installation location is lower, such as 480 volts. Thus, as shown by the illustrative embodiment, a voltage increase is provided from 480V up to 600V. The specific change in voltage (480V to 600V) is provided solely for illustrative purposes and not meant to be limiting on the invention. Thus, other voltage changes can be accommodated utilizing the auto-transformer configuration of FIG. 6.

FIG. 7 also displays wiring schematic of a zig-zag connected phase-shifting auto-transformer 750 with input windings connected to a twelve-pulse rectifier to provide rectifier system 760. However, auto-transformer 750 of FIG. 7 is distinguishable for the previous two transformers (of FIGS. 4A and 6) because the second winding of each of the internal winding pairs 730, 732, 734 is itself extended beyond the tap of the corresponding output windings 720, 722, 724 so that each second winding is itself tapped by the corresponding output winding 720, 722, 724.

In an alternate embodiment, additional coils (or windings) 740, 742, 744 are coupled to the tap of the output windings 720, 722, 724 and the end of the second windings (of the internal winding pairs 730, 732, 734) at a first end and then to the output terminals (at X1, X2, X3) of the series impedance circuit 100/101 at the second end. These additional windings 740, 742, 744 are each a single winding and are juxtaposed across from the internal pairs of winding 730, 732, 734 relative to the output winding 720, 722, 724.

With the taps on the second winding of the internal winding pairs (or the additional windings) in the above configuration, the no-load voltage at 710 is lower than the voltage of the input power applied at the input terminals 705. This embodiment is useful where the rectifier is designed for a certain rated voltage, such as 480 volts, and the power system available at the installation location is higher, such as 600 volts. The illustrative embodiment indicates a voltage change from 600V down to 480V. Again, this change is presented solely for illustrative purposes, and other voltage changes may be accommodated utilizing variations of the circuit of FIG. 7.

FIG. 8 provides a LHRC device 800 with a multi-level configuration of an auto-transformer 850 as a component of the rectifier system 860. As shown, a first level of auto-transformer 850 comprises one of the above three described auto-transformers, while a second level (connected in series to the first level) comprises two similarly configured auto-transformers. The output connectors/wires of the auto-transformer at the first level serve as the two pairs of three phase inputs for respective ones of the two auto-transformers at the second level. For purposes of the invention, the term "level" refers solely to the output of one auto-transformer serving as the input of another transformer, regardless of the actual physical configuration of the overall transformer system. With these configurations, however, the illustrated transformer system is able to support 24-pulse rectification rather than a 12-pulse rectification with a single level configuration. Each auto-transformer design of FIGS. 4A-4C, 6, and 7 can be extended to provide multi-level extensions of the auto-transformer and increase the level of rectification supported. With example FIG. 8, the numerical references within the first level auto-transformer are followed by label A, while the two auto-transformers at the second level are followed by labels B and C, respectively (e.g., 420A on first level auto-transformer, and 420B, 420C on respective second level auto-transformers). The use of these alphanumeric-labels indicates that the configurations of the auto-transformers are substantially similar and thus share similar numeric labels.

FIG. 8 thus displays a multi-level configuration of zig-zag connected, phase-shifting auto-transformers connected to a twenty-four-pulse rectifier 815 to yield an output 817. Each of the corresponding ends of the output windings 820A, 822A, 824A of the first level auto-transformer is coupled to the input wires of one of the second level auto-transformers, which connects at corresponding inputs X1, X2, X3. Input terminal 805 is connected to level one auto-transformer similarly as in FIG. 4A. With the configuration of FIG. 8, the no-load voltage at 810 is approximately 4.5% higher than the voltage of the input power system 805. As with auto-transformer of FIG. 4A, the present voltage boost is expected and falls within acceptable rectifier operating limits.

Each of the above illustrated and described zig-zag connected, phase shifting, auto transformers comprises one or more sets of three output phases that are time delayed relative to the input and other sets of three output phases that are time advanced relative to the input. However, some twelve pulse rectifier applications require that one set of outputs has a different amount of time difference (phase shift) relative to the input when compared with the other output. For example, an auto-transformer may be required that exhibits asymmetrical phase shifts of 7.5° for one of the outputs relative to the input while the other output is shifted 22.5° in the opposite direction. With the above phase shifting auto transformers, the direction (delay or advance of the output) depends on the phase sequence (A-B-C or A-C-B) of the input. When the input phase sequence is reversed (i.e., changed form A-B-C to A-C-B), the output that was shifted 7.5° in one direction will then be shifted 7.5° in the opposite direction. Additionally, the output that was shifted 22.5° in one direction will then be shifted 22.5° in the opposite direction (or −22.5°). This asymmetrical shifting allows multiple twelve-pulse rectifiers to be arranged to appear to the power system as a twenty-four-pulse load.

The above-described illustrative embodiment provides advanced auto transformers with wiring schemes that (a) overcomes the problems of zero-sequence currents and (b) reduces the effects of both lower order and higher order harmonics for multi-pulse rectification. The invention solves the problems inherent in conventional auto-transformer implementations, which typically do not work with rectifiers of twelve or more pulse configuration, because the conventional transformers do not (a) block the flow of unwanted, zero sequence currents without additional components such as inter-phase transformers or zero sequence blocking transformers. Further, the conventional transformer implementations also do not block the negative effects of high order harmonics when applied to the multi-pulse rectifiers.

The above illustrative embodiments generally provide an electrical device having a series impedance circuit, a low harmonic rectifier and converter circuit, and a method for making the same. A method, device, and plurality of circuit enhancements for a rectifier system are provided, and enable reduction in lower order and higher order harmonics, without substantially reducing the rectifier's direct current output voltage. The rectifier system comprises a phase shifting primary transformer subsystem and a multi-pulse rectifier. At least one (but in most implementations three) series impedance path is coupled to one of three input terminals/leads of the transformer subsystem and conducts three phase currents from a power supply to the transformer subsystem. The series impedance path provides low impedance to the $1^{st}$ harmonic and substantially higher, inductive impedance to higher harmonics of the power supply frequency. The impedance of the series impedance path at a selected frequency above a third harmonic of the power supply's fundamental frequency divided by the impedance at the fundamental frequency of the three phase power supply is substantially greater than the selected frequency divided by the fundamental frequency of the power supply.

In one embodiment, the current transformer within the series impedance circuit is constructed on a three-phase core. Also, in one embodiment, the inductor within the impedance circuit is constructed as a three-phase inductor. The method reduces harmonics in a converter system by coupling an output of one of three series impedance circuit to corresponding inputs of a primary, three phase transformer having three inputs and providing at least N outputs to an 2N-pulse rectifier; and assigning an input terminal of each of the three series impedance circuit as a power input terminal for connecting to a leg of a three phase power supply. The method also includes enabling powering of the 2N-pulse rectifier via a power supply voltage applied across the input terminals of the three series impedance circuits.

While the invention has been particularly shown and described with reference to a preferred embodiment, it will be understood by those skilled in the art that various changes in form and detail may be made therein without departing from the spirit and scope of the invention.

What is claimed is:
1. An electrical device comprising:
   a 2N-pulse rectifier having N inputs and providing a set of output terminals/leads, including at least one negative and one positive output terminal/lead;
   a transformer subsystem having at least one multiple phase transformer with (a) three input terminals/leads, and (b) N output terminals/leads arranged for electrical connection to respective ones of the N inputs of the 2N-pulse rectifier; and
   at least one series impedance path coupled to one of the three input terminals/leads of the transformer subsystem and which conducts one phase of three phase currents from a three phase power supply to a connected one of the three input terminals/leads of the transformer subsystem, wherein an impedance of the at least one series impedance path is affected by the frequency of the current flowing through the path and wherein the impedance of the at least one series impedance path at any selected frequency above a third harmonic of a fundamental frequency of the three phase power supply divided by the impedance at the fundamental frequency of the three phase power supply is substantially greater than the selected frequency divided by the fundamental frequency of the power supply.

2. The electrical device of claim 1, wherein the at least one series impedance path is three series impedance paths each coupled to individual ones of the three input terminals/leads of the transformer subsystem.

3. The electrical device of claim 2, wherein each of said series impedance paths comprises a current transformer having a primary winding and a secondary winding.

4. The electrical device of claim 3, wherein the secondary winding of each current transformer is connected in series with serially-connected inductance and serially-connected capacitance.

5. The electrical device of claim 4, wherein an impedance of said serially-connected capacitance substantially cancels at least half of the impedance of said serially-connected inductance when operational at the fundamental power supply frequency.

6. The electrical device of claim 3, wherein a turns ratio from the primary winding to the secondary winding of at least one current transformer is adjustable and wherein the current transformer comprises one or more of:
   an adjustable turns mechanism associated with the primary winding to selectively change an effective number of turns of the primary winding; and
   an adjustable turns mechanism associated with the secondary winding to selectively change an effective number of turns of the secondary winding that couples in series to the serially-connected capacitance and inductance.

7. The electrical device of claim 1, wherein an impedance of each series impedance path is at least twenty times as great at an eleventh harmonic of the power supply frequency as the impedance at the fundamental power supply frequency.

8. The electrical device of claim 1, wherein N equals a whole number multiple of three.

9. The electrical device of claim 1, wherein each of the at least one series impedance path comprises a series impedance circuit as a separate device having an external casing, an accessible input terminal/lead and an accessible output terminal/lead, and a plurality of electrical components disposed within the external casing, which components enables a reduction in harmonic currents at the 2N-pulse rectifier on when the three phase currents flows through the three phase power supply at a power supply input terminal/lead of the series impedance path.

10. The electrical device of claim 1, wherein the at least one series impedance path is provided within a single device having an external casing and a plurality of internal electrical components which collectively provide at least one separately accessible input terminal/lead and at least one separately accessible output terminal/lead, wherein the plurality of internal electrical components are disposed within the external casing and collectively enables a reduction in harmonic currents at the 2N-pulse rectifier when the three phase currents flow through the three phase power supply at a power supply input terminal/lead of the at least one series impedance path.

11. The electrical device of claim 1, wherein the primary transformer comprises one or more three phase, ziz-zag connected, phase shifting auto-transformers.

12. A low harmonic rectifier circuit comprising:
   a 2N-pulse rectifier having N inputs and providing a set of output terminals/leads, including at least one negative and one positive output terminal/lead;
   a transformer subsystem having at least one multiple phase transformer with (a) three input terminals/leads, and (b) N output terminals/leads arranged for electrical connection to respective ones of the N inputs of the 2N-pulse rectifier; and
   at least one series impedance path coupled to one of the three input terminals/leads of the transformer subsystem and which conducts one phase of three phase currents from a three phase power supply to a connected one of the three input terminals/leads of the transformer subsystem, wherein an impedance of the at least one series impedance path is affected by the frequency of the current flowing through the path and wherein the impedance of the at least one series impedance path at any selected frequency above a third harmonic of a fundamental frequency of the three phase power supply divided by the impedance at the fundamental frequency of the three phase power supply is substantially greater than the selected frequency divided by the fundamental frequency of the power supply.

13. The low harmonic rectifier circuit of claim 12, wherein the at least one series impedance path is three series impedance paths each coupled to individual ones of the three input terminals/leads of the transformer subsystem.

14. The low harmonic rectifier circuit of claim 13, wherein each of said series impedance paths comprises a current transformer having a primary winding and a secondary winding.

15. The low harmonic rectifier circuit of claim 14, wherein:
   the secondary winding of each current transformer is connected in series with serially-connected inductance and serially-connected capacitance; and
   an impedance of said serially-connected capacitance substantially cancels at least half of the impedance of said serially-connected inductance when operational at the fundamental power supply frequency.

16. The low harmonic rectifier circuit of claim 14, wherein a turns ratio from the primary winding to the secondary winding of at least one current transformer is adjustable and the current transformer comprises one or more of:
   an adjustable turns mechanism associated with the primary winding to selectively change an effective number of turns of the primary winding; and
   an adjustable turns mechanism associated with the secondary winding to selectively change an effective number of turns of the secondary winding that couples in series to the serially-connected capacitance and inductance.

17. The low harmonic rectifier circuit of claim 14, wherein:
   each series impedance path enables a reduction in harmonic currents at the 2N-pulse rectifier on receipt of the three phase currents from the three phase power supply at a power supply input terminal/lead of the series impedance path; and
   an impedance of each series impedance path is at least twenty times as great at an eleventh harmonic of the power supply frequency as the impedance at the fundamental power supply frequency.

18. The low harmonic rectifier circuit of claim 12, wherein N equals a whole number multiple of three.

19. The low harmonic rectifier circuit of claim 12, wherein each of the at least one series impedance path comprises a series impedance circuit as a separate device having an external casing, an accessible input terminal/lead and an accessible output terminal/lead, and a plurality of electrical components disposed within the external casing, which components enables a reduction in harmonic currents at the 2N-pulse rectifier when the three phase currents flows through the three phase power supply at a power supply input terminal/lead of the series impedance path.

20. The low harmonic rectifier circuit of claim 12, wherein the at least one series impedance path is provided within a single device having an external casing and a plurality of internal electrical components which collectively provide at least one separately accessible input terminal/lead and at least one separately accessible output terminal/lead, wherein the plurality of internal electrical components are disposed within the external casing and collectively enables a reduction in harmonic currents at the 2N-pulse rectifier when the three phase currents flows through the three phase power supply at a power supply input terminal/lead of the at least one series impedance path.

21. A device for reducing harmonic currents within a rectifier system, the device comprising:
   a power input terminal/lead;
   an output terminal/lead for connecting to an input terminal/lead of a transformer subsystem; and
   a plurality of components electrically coupled between the input terminal/lead and the output terminal lead and which conduct one leg of a three phase current from a three phase power supply to the input terminal/lead of the transformer subsystem, wherein an impedance of a series impedance path provided by the device is affected by the frequency of the current flowing through the path and wherein the impedance of each series impedance path at a selected frequency higher than a third harmonic of a fundamental frequency of the three phase power supply divided by the impedance at the fundamental frequency of the three phase power supply is substantially greater than the selected frequency divided by the fundamental frequency of the power supply.

22. The device of claim 21, wherein each of said series impedance paths comprises a current transformer having a primary winding and a secondary winding.

23. The device of claim 22, wherein the secondary winding of each current transformer is connected in series with serially-connected inductance and serially-connected capacitance.

24. The device of claim 23, wherein an impedance of said serially-connected capacitance substantially cancels at least half of the impedance of said serially-connected inductance when operational at the fundamental power supply frequency.

25. The device of claim 22, wherein a turns ratio from the primary winding to the secondary winding of at least one current transformer is adjustable.

26. The device of claim 25, wherein the current transformer comprises one or more of:
   an adjustable turns mechanism associated with the primary winding to selectively change an effective number of turns of the primary winding; and
   an adjustable turns mechanism associated with the secondary winding to selectively change an effective number of turns of the secondary winding that couples in series to the serially-connected capacitance and inductance.

27. The device of claim 21, wherein an impedance of each series impedance path is at least twenty times as great at an eleventh harmonic of the power supply frequency as the impedance at the fundamental power supply frequency.

28. The device of claim 21, further comprising:
   two additional power input terminals;
   two additional output terminals; and
   additional components electrically coupled between the two additional power input terminal/lead and the two additional output terminal lead and which conduct a next two legs of a three phase currents from a three phase power supply to the input terminal/lead of the transformer subsystem, wherein an impedance of a series impedance path provided by the device is affected by the frequency of the current flowing through the path and wherein the impedance of each series impedance path at a selected frequency higher than a third harmonic of a fundamental frequency of the three phase power supply divided by the impedance at the fundamental frequency of the three phase power supply is substantially greater than the selected frequency divided by the fundamental frequency of the power supply.

29. A method for reducing harmonics in an electrical converter system, said method comprising:
   electrically coupling a series impedance path to at least one of three input terminals/leads of a transformer subsystem of a rectifier system, wherein the series impedance path conducts one leg of a three phase current from a three phase power supply to one of the three input terminals/leads of the transformer subsystem, wherein an impedance of the at least one series impedance path is affected by the frequency of the current flowing through the path and wherein the impedance of the at least one series impedance path at a selected frequency higher than a third harmonic of a fundamental frequency of the three phase power supply divided by the impedance at the fundamental frequency of the three phase power supply is substantially greater than the selected frequency divided by the fundamental frequency of the power supply; and
   assigning an input terminal/lead of each of the three series impedance paths as a power input terminal for connecting to one of three legs of a three phase power supply.

30. The method of claim 29, further comprising applying a power supply voltage across the input terminals/leads of the at least one series impedance paths, wherein the applying a power supply to the input terminals/leads enables powering of the transformer subsystem and the rectifier system.

31. The method of claim 29, wherein the series impedance path comprises:
   a power input terminal/lead;
   an output terminal/lead for connecting to an input terminal/lead of the transformer subsystem; and
   a plurality of components electrically coupled between the input terminal/lead and the output terminal lead and which conduct one leg of a three phase currents from a three phase power supply to the input terminal/lead of the transformer subsystem, wherein an impedance of a series impedance path provided by the device is affected by the frequency of the current flowing through the path and wherein the impedance of each series impedance path at a selected frequency higher than a third harmonic of a fundamental frequency of the three phase power supply divided by the impedance at the fundamental frequency of the three phase power supply is substantially greater than the selected frequency divided by the fundamental frequency of the power supply.

32. The method of claim 31, wherein the plurality of components comprises a current transformer having a primary winding and a secondary winding, wherein the secondary winding of each current transformer is connected in series with serially-connected inductance and serially-connected capacitance.

33. The method of claim 32, wherein an impedance of said serially-connected capacitance substantially cancels at least half of the impedance of said serially-connected inductance when operational at the fundamental power supply frequency.

34. The method of claim 32, wherein a turns ratio from the primary winding to the secondary winding of at least one current transformer is adjustable, and said method further comprises selectively adjusting one or more of:
   an adjustable turns mechanism associated with the primary winding to selectively change an effective number of turns of the primary winding; and an adjustable turns mechanism associated with the secondary winding to selectively change an effective number of turns of the secondary winding that couples in series to the serially-connected capacitance and inductance.

35. The method of claim 29, wherein said electrically coupling a series impedance path to at least one of the three input terminals/leads further comprises coupling three series impedance paths, each coupled to one of the three input terminals/leads of a transformer subsystem of the rectifier system.

* * * * *